(12) United States Patent
Zimmerman et al.

(10) Patent No.: US 11,019,222 B2
(45) Date of Patent: *May 25, 2021

(54) SYSTEM, METHOD, AND PROCESS FOR HANDLING WIRELESS SERVICE AND WIRELESS DEVICE TRANSACTION AND INFORMATION REQUESTS

(71) Applicant: TracFone Wireless, Inc., Miami, FL (US)

(72) Inventors: James Zimmerman, Miami, FL (US); Ricky Ramon, Miami, FL (US); Stephen Ritter, Miami, FL (US)

(73) Assignee: TracFone Wireless, Inc., Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/736,338

(22) Filed: Jan. 7, 2020

(65) Prior Publication Data

US 2020/0145537 A1 May 7, 2020

Related U.S. Application Data

(63) Continuation of application No. 15/968,046, filed on May 1, 2018, now Pat. No. 10,530,937.

(60) Provisional application No. 62/492,495, filed on May 1, 2017.

(51) Int. Cl.
*H04M 15/00* (2006.01)
*H04W 4/14* (2009.01)
*H04W 4/24* (2018.01)
*H04M 17/00* (2006.01)
*H04W 8/18* (2009.01)
*H04M 17/02* (2006.01)

(52) U.S. Cl.
CPC ......... *H04M 15/715* (2013.01); *H04M 17/02* (2013.01); *H04M 17/204* (2013.01); *H04W 4/14* (2013.01); *H04W 4/24* (2013.01); *H04W 8/18* (2013.01); *H04W 8/183* (2013.01)

(58) Field of Classification Search
CPC .. H04M 15/715; H04M 17/204; H04M 17/02; H04W 4/24; H04W 8/183; H04W 4/14; H04W 8/18
See application file for complete search history.

(56) References Cited

U.S. PATENT DOCUMENTS

| | | | |
|---|---|---|---|
| 5,887,253 A * | 3/1999 | O'Neil ................. | H04W 8/265 455/410 |
| 2004/0078332 A1* | 4/2004 | Ferguson ............... | G06Q 30/06 705/41 |
| 2006/0143098 A1* | 6/2006 | Lazaridis ............... | G06Q 30/04 705/34 |
| 2010/0311402 A1* | 12/2010 | Srinivasan ............ | H04W 8/183 455/418 |
| 2011/0028135 A1* | 2/2011 | Srinivasan ........ | H04M 3/42382 455/415 |

(Continued)

*Primary Examiner* — Minjung Kim
(74) *Attorney, Agent, or Firm* — BakerHostetler

(57) ABSTRACT

A process for handling wireless service and wireless device transaction and information requests includes storing in a database wireless service information responses, wireless service transaction responses, wireless device information responses, and wireless device transaction responses. The process including receiving and analyzing a keyword, obtaining a response, based at least on the keyword, and transmitting the response.

20 Claims, 12 Drawing Sheets

(56) References Cited

U.S. PATENT DOCUMENTS

| | | | |
|---|---|---|---|
| 2011/0070877 A1* | 3/2011 | Macaluso | H04W 8/205 |
| | | | 455/419 |
| 2011/0098030 A1* | 4/2011 | Luoma | H04M 3/42153 |
| | | | 455/419 |
| 2011/0217994 A1* | 9/2011 | Hirson | G06Q 30/04 |
| | | | 455/466 |
| 2013/0130642 A1 | 5/2013 | Joul et al. | |
| 2013/0246066 A1* | 9/2013 | Choi | G10L 17/005 |
| | | | 704/246 |
| 2013/0346422 A1* | 12/2013 | Jordahl | G06F 16/24578 |
| | | | 707/748 |

\* cited by examiner

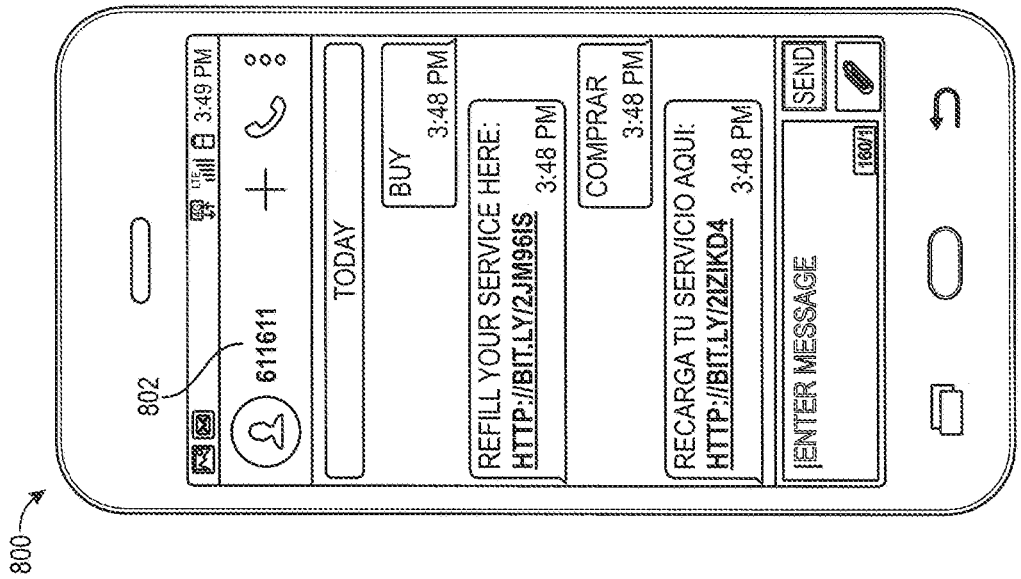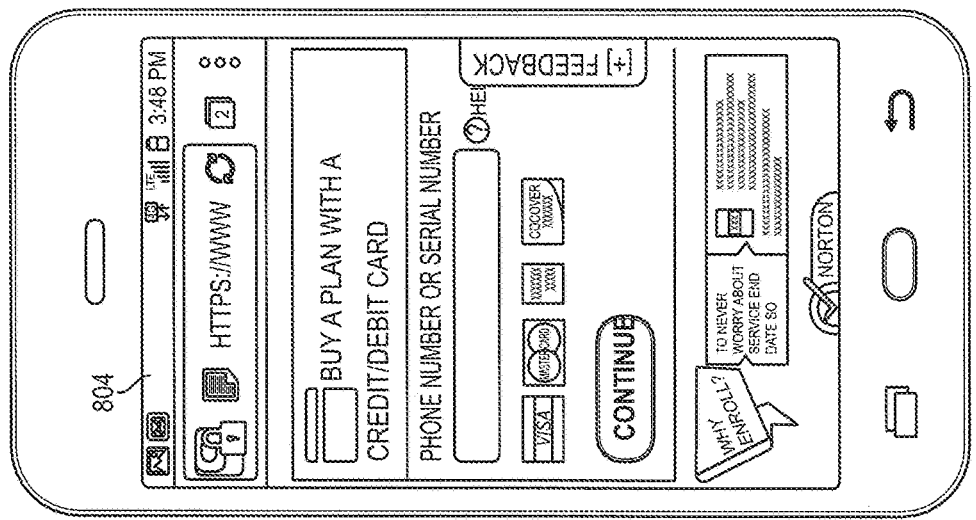
FIG. 8

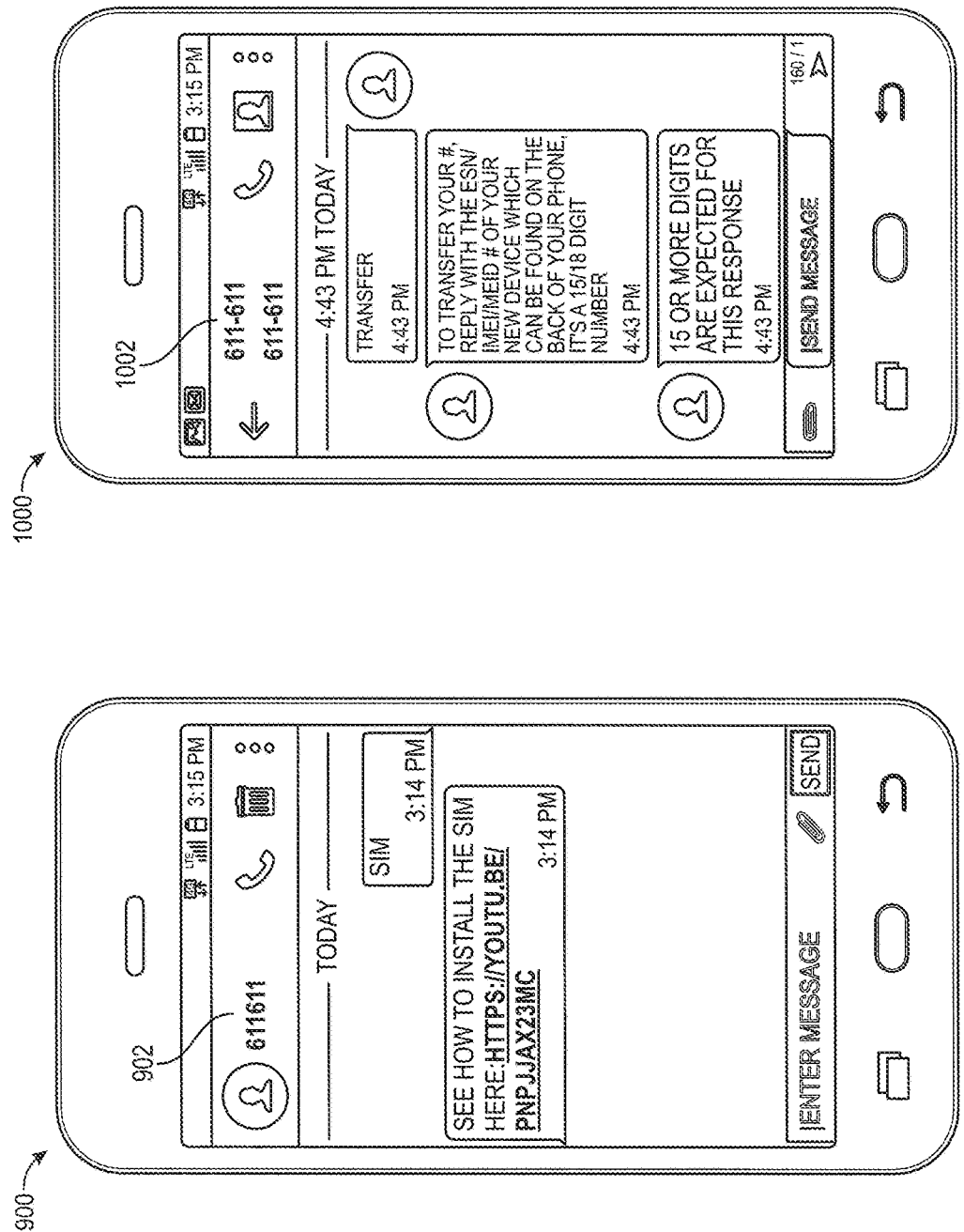

SYSTEM, METHOD, AND PROCESS FOR HANDLING WIRELESS SERVICE AND WIRELESS DEVICE TRANSACTION AND INFORMATION REQUESTS

CROSS REFERENCE TO PRIOR APPLICATIONS

This application is a continuation of U.S. application Ser. No. 15/968,046 filed on May 1, 2018, now the U.S. Pat. No. 10,530,937 issued Jan. 7, 2020, which is hereby incorporated by reference in its entirety for all purposes as if fully set forth herein; and which application claims the benefit from U.S. Provisional Application No. 62/492,495 filed on May 1, 2017, which is hereby incorporated by reference in its entirety for all purposes as if fully set forth herein.

BACKGROUND OF THE DISCLOSURE

1. Field of the Disclosure

The disclosure relates to a system, method, and process for handling wireless service and wireless device transaction and information requests. More particularly, the disclosure relates to system, method, and process for handling wireless service and wireless device transaction and information requests via text message and/or other communication formats.

2. Related Art

Wireless users often have a need to obtain information or conduct transactions with respect to their wireless service and/or wireless device. Typically, this involves contacting a wireless service agent, browsing a wireless service website, or the like. Contacting a wireless service agent is time-consuming and may result in limited orally provided information. On the other hand, browsing a wireless service website consumes data, is likewise time-consuming, and it is often difficult to find and obtain the particular information or to complete a desired transaction.

Accordingly, a need exists to provide a system, method, and process for handling wireless service and wireless device transaction and information requests in an easy to use and expedited manner.

SUMMARY OF THE DISCLOSURE

The foregoing needs are met, to a great extent, by the disclosure, providing a system, method, and process for handling wireless service and wireless device transaction and information requests via text message and/or other communication formats.

According to some aspects of the disclosure a system for handling wireless service and wireless device transaction and information requests includes a database configured to store wireless service information responses, wireless service transaction responses, wireless device information responses, and wireless device transaction responses; at least one processor configured to receive a communication from a wireless device, the communication including a keyword associated with at least one of the following: a wireless service information request, a wireless service transaction request, a wireless device information request, and a wireless device transaction request; the at least one processor further configured to analyze the keyword in the communication from the wireless device and determine a response to the wireless service information request, the wireless service transaction request, the wireless device information request, or the wireless device transaction request; the at least one processor further configured to obtain from the database a response, based at least on the keyword, to the wireless service information request, the wireless service transaction request, the wireless device information request, or the wireless device transaction request; and the at least one processor further configured to transmit a communication to the wireless device that includes the response to the wireless device, the response being associated to the wireless service information request, the wireless service transaction request, the wireless device information request, or the wireless device transaction request.

According to some aspects of the disclosure a process for handling wireless service and wireless device transaction and information requests includes storing in a database wireless service information responses, wireless service transaction responses, wireless device information responses, and wireless device transaction responses; receiving with at least one processor a communication from a wireless device, the communication including a keyword associated with at least one of the following: a wireless service information request, a wireless service transaction request, a wireless device information request, and a wireless device transaction request; analyzing with the at least one processor the keyword in the communication from the wireless device and determining a response to the wireless service information request, the wireless service transaction request, the wireless device information request, or the wireless device transaction request; obtaining with the at least one processor from the database a response, based at least on the keyword, to the wireless service information request, the wireless service transaction request, the wireless device information request, or the wireless device transaction request; and transmitting by the at least one processor a communication to the wireless device that includes the response to the wireless device, the response being associated to the wireless service information request, the wireless service transaction request, the wireless device information request, or the wireless device transaction request.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will also form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such those skilled in the art will appreciate that the conception upon which this disclosure is based may readily be utilized as a basis for the designing of other structures, methods and systems for carrying out the several purposes of the disclosure. It is important, therefore, that the claims be regarded as including such equivalent constructions insofar as they do not depart from the spirit and scope of the disclosure.

BRIEF DESCRIPTION OF THE DRAWINGS

The above mentioned features and aspects of the disclosure will become more apparent with reference to the following description taken in conjunction with the accompanying drawings wherein like reference numerals denote like elements and in which:

FIG. 8 illustrates screenshots associated with the wireless service and wireless device transaction and information requests process for buying wireless service in accordance with aspects of the disclosure.

FIG. 9 illustrates a screenshot associated with the wireless service and wireless device transaction and information requests process for SIM installation in accordance with aspects of the disclosure.

FIG. 10 illustrates a screenshot associated with the wireless service and wireless device transaction and information requests process for transferring in accordance with aspects of the disclosure.

DETAILED DESCRIPTION

Figure 1:
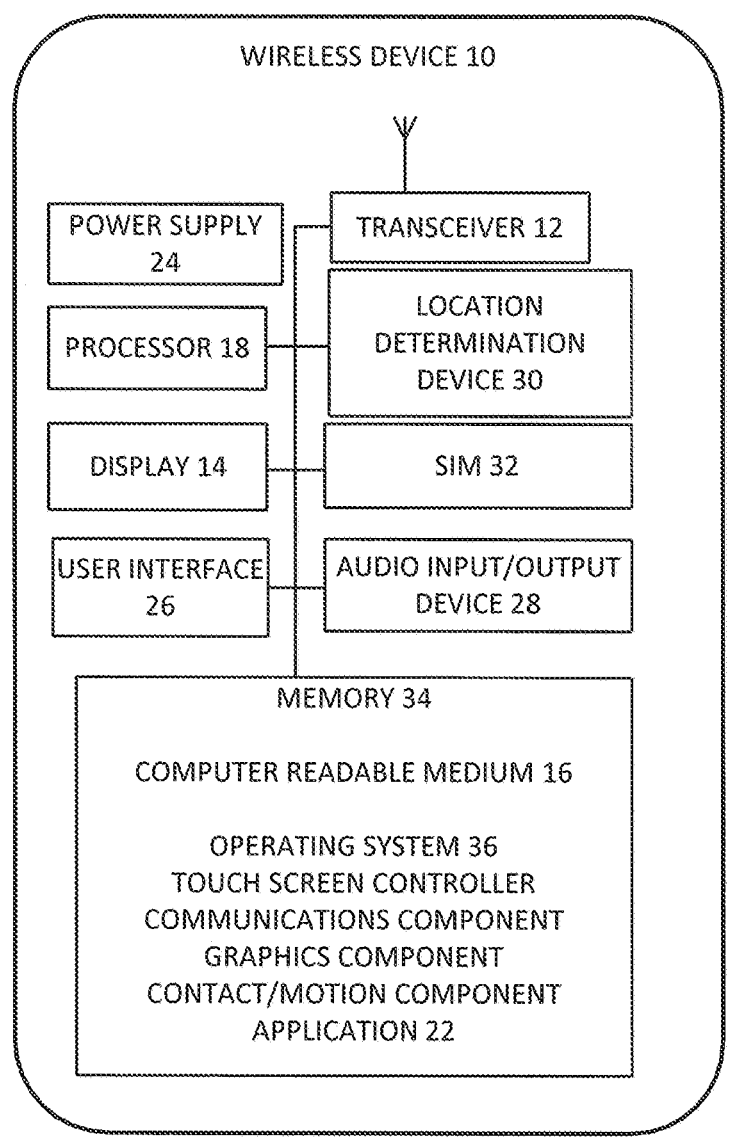
FIG. 1 illustrates an exemplary wireless device and its components, in accordance with aspects of the disclosure.

A large number of wireless service plans exist for customers desiring wireless services such as data, talk, and text messaging. To obtain these wireless services, customers generally have the option of entering into a post-paid service, e.g., contract for a period of time, or a pre-paid, contract-free service. The latter offers customers the freedom to initiate and stop wireless services without incurring expensive cancellation fees associated with a post-paid service.

Generally, companies that provide post-paid wireless services are wireless carriers or Mobile Network Operators (MNOs) that maintain and control their own wireless networks. A MNO heavily relies on backend systems to address any provisional, billing, security and data issues that might threaten the health of their networks. On the other hand, a Mobile Virtual Network Operator (MVNO) is a mobile operator that typically does not own its own frequency spectrum or have its own network infrastructure. MVNOs negotiate and enter into business agreements with third party wireless carriers or MNOs to purchase the right to use their networks for wireless services including volume of data, number of minutes of airtime/voice, and number of text messages used. In some aspects, the MVNO may utilize a plurality MNOs or wireless carriers. In some aspects, the MVNO may implement a plurality virtual network and/or virtual wireless carriers as a plurality of service offerings.

Convenience, timeliness, cost, service, and reliability of the wireless providers' systems and associated wireless devices are key factors that play into a user's experience. By developing a system to improve at least one or more of these factors, a more positive experience can be provided to the wireless user. The improved experience will help retain customer base and increase the number of customers willing to purchase wireless services. In order to do so, the following needs can be addressed with a system, method, and process for handling wireless service and wireless device transaction and information requests based on text messages and other communication formats.

In this regard, both MNOs and MVNOs may benefit from the disclosed system, method, and process for handling wireless service and wireless device transaction and information requests based on text message short codes and other communication formats.

In this disclosure and claims it is to be understood that reference to a wireless device is intended to encompass electronic devices such as mobile phones, tablet computers, gaming systems, MP3 players, personal computers, PDAs, smart speakers, and the like. A "wireless device" is intended to encompass any compatible mobile technology computing device that can connect to a wireless communication network, such as mobile phones, mobile equipment, mobile stations, user equipment, cellular phones, smartphones, handsets, or the like (e.g., Apple iPhone, Google Android based devices, BlackBerry based devices, other types of PDAs or smartphones), wireless dongles, remote alert devices, Internet of things (IoT) based wireless devices, smart speakers, or other mobile computing devices that may be supported by a wireless network. The term "wireless device" may be interchangeably used and referred to herein as "smart speaker," "wireless handset," "handset," "mobile device," "device," "mobile phones," "mobile equipment," "mobile station," "user equipment," "cellular phone," "smartphones," "monitoring device" or "phone."

Wireless devices may connect to a "wireless network" or "network" and are intended to encompass any type of wireless network to obtain or provide mobile phone services through the use of a wireless device, such as the Global System for Mobile Communication (GSM) network, Code-Division Multiple Access (CDMA) network, Long-Term Evolution (LTE) network, 4G, 5G, Wi-Fi, a network implementing a communication channel as defined herein, and the like that may utilize the teachings of the disclosure.

Reference in this disclosure to "one aspect," "an aspect," "other aspects," "one or more aspects" or the like means that a particular feature, structure, or characteristic described in connection with the aspect is included in at least one aspect of the disclosure. The appearances of, for example, the phrase "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described which may be requirements for some aspects but not for other aspects.

FIG. 1 illustrates an exemplary wireless device and its components, in accordance with aspects of the disclosure. In one aspect, the disclosed system, method, and process for handling wireless service and wireless device transaction and information requests may interact with a wireless device 10 as illustrated in FIG. 1. In one aspect, the disclosed system, method, and process for handling wireless service and wireless device transaction and information requests may be initiated by the wireless device 10 illustrated in FIG. 1. In one aspect, the disclosed system, method, and process for handling wireless service and wireless device transaction and information requests may interact with the wireless device 10 and may be initiated by the wireless device 10 illustrated in FIG. 1. In one aspect, the disclosed system, method, and process for handling wireless service and wireless device transaction and information requests may interact with the wireless device 10 and may be initiated by a different wireless device 10, such as a smart speaker.

FIG. 1 illustrates an exemplary aspect of the wireless device 10. The wireless device 10 may include a transceiver 12, a display 14, a computer readable medium 16, and a processor 18. The transceiver 12 can include, for example, a wireless antenna and associated circuitry capable of data transmission with a mobile data network utilizing at least one data transmission protocol, such as, for example, 3G, 4G, LTE, 5G, Evolution-Data Optimized (EVDO), CDMA, High Speed Packet Access (HSPA), Global System for Mobile Communications (GSM), W-CDMA (Wideband Code-Division Multiple Access), Wi-Fi, Bluetooth, a communication channel as defined herein, combinations thereof, and/or the like. The transceiver 12 may transmit and receive data utilizing the data transmission protocol. Moreover, the transceiver 12 may provide voice and text message capabilities. In one aspect, the processor 18 and/or the transceiver 12 may be implemented in a wireless device chipset.

The display 14 of the wireless device 10 may be configured to display various information provided to the display 14 from the processor 18 of the wireless device 10, computer readable medium 16, and/or an application 22. The screen may be a light-emitting diode display (LED), an electroluminescent display (ELD), a plasma display panel (PDP), a liquid crystal display (LCD), an organic light-emitting diode display (OLED), active-matrix organic light-emitting diode (AMOLED) display, IPS (In-plane switching) liquid crystal displays (LCDs), or any other display technology.

The displayed information can include, for example, an amount of prepaid wireless data service available, the network connection strength, the type of mobile network data connection (such as 3G, 4G LTE, EVDO, etc.) the wireless device 10 is connected to, and/or other information potentially useful to the user. The information may be displayed simultaneously or the user may interact with an input device such as a touch-screen, with the icons on the display 14 to cycle through the various types of information for display. In operation, the display 14 may display various icons associated with applications for execution by the processor 18. In this regard, a user may touch the display 14 to interact with the icons. For example touching an icon may execute an application in the processor 18 associated with the icon that is stored in memory 34. Additionally or alternatively, touching an icon may open a menu of options to be selected by the user. The display 14 may include a plurality of the icons for the user to interact with. Moreover, the display 14 may include a plurality of screens. The display 14 showing one screen at a time. The user may interact with the display 14 to move a screen into view on the display 14. Various icons may be located in the each of the screens.

In one aspect, the application 22 may be a text messaging application. The text messaging application may be configured to generate an interface on the wireless device 10 that is configured to receive a destination address and a message content. The term text, text message, or SMS (Short Message Service) is a text messaging service component of phone, web, or mobile communication systems. It uses standardized communications protocols to allow fixed line or mobile phone devices to exchange short text messages. In other aspects, the text message may include a Multimedia Messaging Service (MMS), which is a standard way to send messages that include multimedia content. It extends the core SMS capability that allowed exchange of text messages only up to 160 characters in length. MMS messages may be delivered in a different way from SMS. The sending wireless device 10 may encode the multimedia content in a fashion similar to sending a MIME e-mail (MIME content formats are defined in the MMS Message Encapsulation specification). The message may then be forwarded to the carrier's MMS store and forward server, known as the MMSC (Multimedia Messaging Service Centre). If the receiver is on another carrier, the relay may forward the message to the recipient's carrier using the Internet.

The computer readable medium 16 may store computer data, which may include computer program code that may be executable by the processor 18 of the wireless device 10 in machine-readable form. By way of example, and not limitation, the computer readable medium 16 may include computer readable storage media, for example tangible or fixed storage of data, or communication media for transient interpretation of code-containing signals. Computer readable storage media, as used herein, refers to non-transitory physical or tangible storage (as opposed to signals) and includes without limitation volatile and non-volatile, removable and non-removable storage media implemented in any method or technology for the tangible storage of information such as computer-readable instructions, data structures, program modules, or other data. In one or more aspects, the actions and/or events of a method, algorithm, or module may reside as one or any combination or set of codes and/or instructions on a computer readable medium 16 or machine-readable medium, which may be incorporated into a computer program product.

The processor 18 can be, for example, dedicated hardware as defined herein, a computing device as defined herein, a processor, a wireless device processor, a microprocessor, a wireless device chipset, a central processing unit (CPU), a programmable logic array (PLA), a programmable array logic (PAL), a generic array logic (GAL), a complex programmable logic device (CPLD), an application-specific integrated circuit (ASIC), a field-programmable gate array (FPGA), any other programmable logic device (PLD), or the like.

The wireless device 10 may also have a power supply 24. The power supply 24 may be a battery such as nickel cadmium, nickel metal hydride, lead acid, lithium ion, lithium ion polymer, and the like. The power supply 24 may also be a wired power source connection to an AC circuit that provides an AC voltage that may be converted to DC voltage for the wireless device 10. The wireless device 10 may also include a memory 34, which may be internal memory or a removable storage type such as a memory chip. The memory 34 may store information about the wireless device 10, including wireless profiles and settings.

Additionally, the wireless device 10 may include an audio input/output device 28 for the input or output of sounds in videos, music, and the like. In some aspects, the wireless device 10 may include a speaker that may be connected to the audio input/output device 28 for output of sounds. In some aspects, the wireless device 10 may include a microphone that may be connected to the audio input/output device 28 for input of sounds.

The wireless device 10 may use a subscriber identity module (SIM) card 32. The SIM 32 may vary in size and may be a micro, mini, nano size, or any size SIM 32. The SIM 32 may store network-specific information used to authenticate and identify subscribers on the network including one or more of an integrated circuit card identifier (ICCID), International Mobile Subscriber Identity (IMSI), Authentication Key (Ki), Local Area Identity (LAI), Operator-Specific Emergency Number, and/or the like. The SIM 32 may also store other carrier-specific data such as the SMSC (Short Message Service Center) number, Service Provider Name (SPN), Service Dialing Numbers (SDN), Advice-Of-Charge parameters, Value Added Service (VAS) applications, and/or the like. The SIM 32 may be identified by its ICCID. ICCIDs may be stored in the SIM cards. The ICCID is defined by the ITU-T recommendation E.118 as the Primary Account Number. The SIM 32 layout may be based on ISO/IEC 7812. In some aspects, the SIM 32 may also be a soft SIM, electronic SIM, or embedded SIM. In some aspects, other memory locations of the wireless device 10 may store carrier-specific data such as the International Mobile Subscriber Identity (IMSI), Authentication Key (Ki), Local Area Identity (LAI), Operator-Specific Emergency Number, the SMSC (Short Message Service Center) number, Service Provider Name (SPN), Service Dialing Numbers (SDN), Advice-Of-Charge parameters, Value Added Service (VAS) applications, and/or the like.

The wireless device 10 may also have a user interface 26 to facilitate use of the wireless device 10 with an operating system 36. The operating system 36 may be associated with a touchscreen controller, one or more communications components, one or more graphics components, one or more contact/motion components, and the like. The operating system 36 may be an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system, or the like.

According to another aspect of the disclosure, the wireless device 10 and/or a network 200 may estimate the location of the wireless device 10 based, at least in part, on a global navigation satellite system (GNSS) with a location determination device 30. In another aspect, a network 200 may secure location determination based on a specific cell in which the wireless device 10 connects. In yet another aspect, a network 200 may obtain location determination based on triangulation with respect to a plurality of cells in which the wireless device 10 receives signals. Each of these approaches may be implemented with the location determination device 30.

In one aspect, the wireless device 10 may include voice recognition software stored in the memory 34 that may be utilized in various aspects of the systems and methods. Users may be able to vocalize input, rather than utilizing other input processes. For example, the voice recognition software may be configured for generating text from voice input from the microphone or other voice input through the audio input/output device 28. The processor 18 or a separate speech signal processor may convert speech signals into digital data that can be processed by the processor 18. The processor 18 may perform several distinct functions, including serving as a speech event analyzer, a dictation event subsystem, a text event subsystem, and an executor of the application program. The speech signal processor may generate speech event data and transmit this data to the processor 18 to be processed first by the speech event analyzer. The speech event analyzer may generate a list or set of possible candidates among the system recordings that represent or match the voice input processed by the speech signal processor. The speech event analyzer may transmit the candidate sets to the dictation event subsystem. The dictation event subsystem may analyze the candidate sets and choose the best match candidate with the highest degree of similarity. This candidate is then considered the correct translation, and the dictation event subsystem forwards the translation to the text event subsystem, which in turn inputs the translated text into the wireless device 10.

In one aspect, the wireless device 10 may be implemented as a smart speaker such as the Amazon Echo. The Amazon echo is available from Amazon.com, Inc., Seattle, Wash., USA. In this regard, the processor 18 may be implemented as a Texas Instruments DM3725 ARM Cortex-A8 processor, the memory 34 may be implemented as 256 MB of LPDDR1 RAM and 4 GB of storage space, the transceiver 12 may be implemented as dual-band Wi-Fi 802.11a/b/g/n and Bluetooth, may include Advanced Audio Distribution Profile (A2DP) support for audio streaming, and may include an Audio/Video Remote Control Profile (AVRCP) for voice control of connected devices. In this aspect, the wireless device 10 may not utilize the display 14, the user interface 26, and the SIM 32. In this aspect, the application 22 may include the voice recognition software. In some aspects, the smart speaker may use interactive voice response (IVR).

In another aspect, the wireless device 10 may be implemented as a smart speaker such as a Google Home. The Google Home is available from Google, Inc., Mountain View, Calif., USA. In this regard, the processor 18 may be implemented as an ARM processor. In this aspect, the wireless device 10 may not utilize the display 14, the user interface 26, and the SIM 32. In this aspect, the application 22 may include the voice recognition software. In some aspects, the smart speaker may use IVR.

In another aspect, the wireless device 10 may be implemented as a smart speaker such as an Apple Home Pod. The Apple Home Pod is available from Apple, Inc., Cupertino, Calif., USA. In this regard, the processor 18 may be implemented as an Apple A8 processor. In this aspect, the wireless device 10 may not utilize the display 14, the user interface 26, and the SIM 32. In this aspect, the application 22 may include the voice recognition software. In some aspects, the smart speaker may use IVR.

Figure 2:
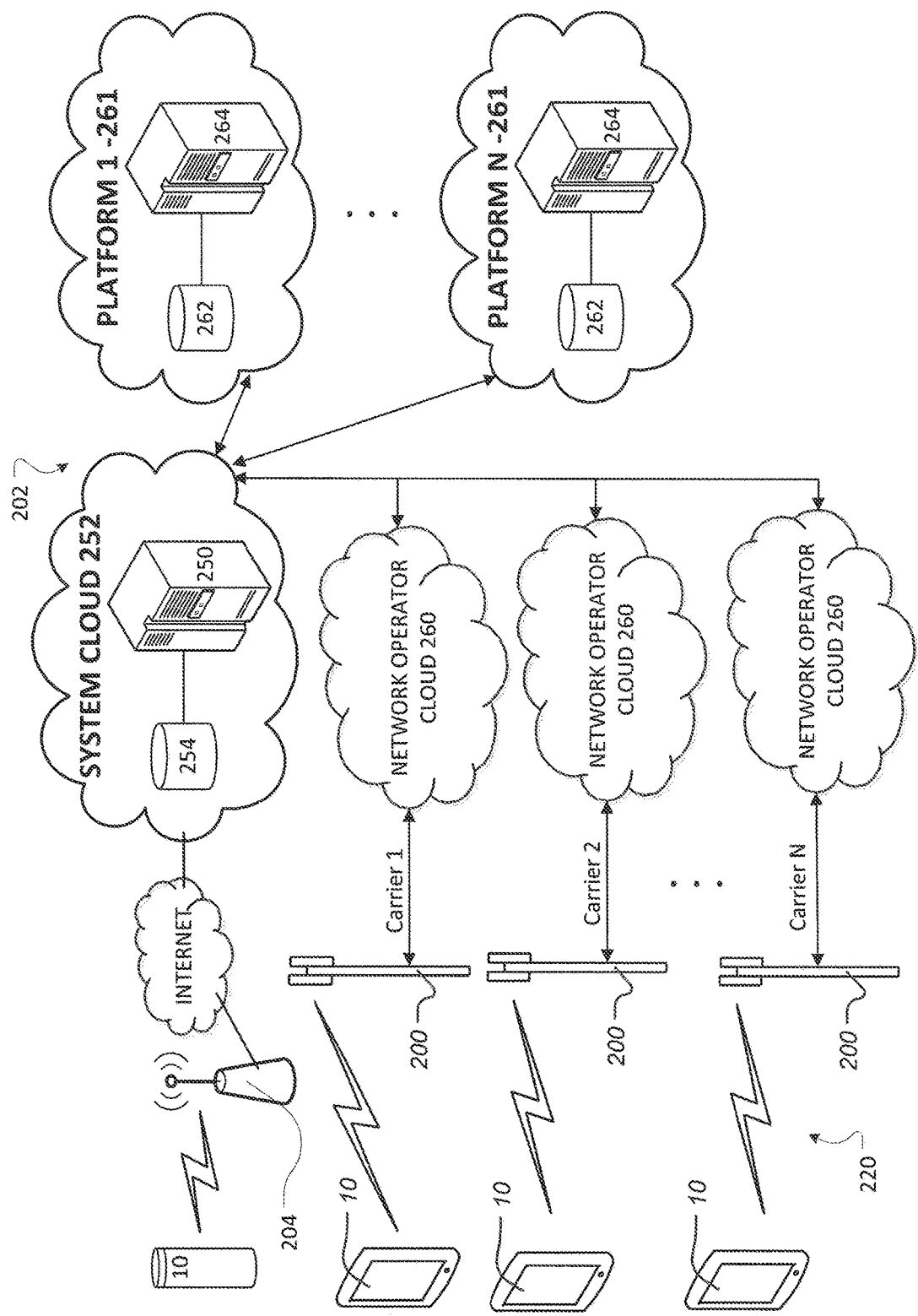
FIG. 2 illustrates a system for handling wireless service and wireless device transaction and information requests as well as a plurality of networks and service providers and wireless devices that may connect with one of the plurality of networks and service providers, in accordance with aspects of the disclosure.

FIG. 2 illustrates a system for handling wireless service and wireless device transaction and information requests as well as a plurality of networks and service providers and wireless devices that may connect with one of the plurality of networks and service providers, in accordance with aspects of the disclosure. As utilized herein, the wireless service and wireless device transaction and information requests may include a wireless service information request, a wireless service transaction request, a wireless device information request, a wireless device transaction request, and the like.

In particular, FIG. 2 illustrates a system 202 that may include a system cloud 252, a processor 250, and a database 254. FIG. 2 further illustrates possible connections between wireless devices 10, networks 200, and/or the system cloud 252. More than one network 200 may be available, one of which may connect to a particular wireless device 10 at a given time and/or location. The type of service provided by the network 200 may include data, voice, SMS, and the like. Alternatively, the wireless device 10 may connect over the Internet directly with the system cloud 252. For example, the wireless device 10 may utilize a communication channel such as Wi-Fi through a wireless access point 204 that connects to the Internet and subsequently to the system cloud 252. In one aspect, a smart speaker implementation of the wireless device 10 may utilize a communication channel such as Wi-Fi through a wireless access point 204 that connects to the Internet and subsequently to the system cloud 252.

The variety of available carriers associated with the one or more networks 200 are represented in FIG. 2 by carrier 1, carrier 2, . . . carrier N. Where N is a positive integer. In other words, there may be an N number of carriers. A network 200 may have its own subscriber profile repository (not shown) which can verify a wireless user account associated with the wireless device 10. When the wireless device 10 has been authenticated on a network 200, the wireless device 10 may connect to a gateway support node (not shown) associated with the network 200 to receive wireless services including data, voice, and text, and/or other wireless services available to the wireless device 10 on the network 200. The gateway support node may also operatively link the wireless device 10 to provide billing and policy services associated with the network 200.

The wireless service and wireless device transaction process may be performed at least in part by the system 202 and/or the system cloud 252. In one aspect, the processor 250 may be configured to receive various format communications from wireless users. In one aspect, the processor 250 may be implemented as a server. In this regard, the processor 250 may include a transceiver, a network switch, or the like to receive the wireless user communications from the Internet and/or the network operator clouds 260. In one aspect, the processor 250 may further connect to external databases to retrieve additional information as needed. The system 202 may further store wireless user data in the database 254. The communications from the wireless users may include a request for wireless service and wireless device transaction and information. Thereafter, the system 202 and/or the system cloud 252 may respond to the wireless user with the requested information and/or transaction. Additionally, the system cloud 252 may also utilize one or more platforms for responding to the wireless user. The one or more platforms may include platform 1-261, . . . platform N-261 (hereinafter referred to as platform 261 for brevity). Where N is a positive integer. In other words, there may be an N number of platforms 261. In one aspect, the database 254 may store wireless service information responses, wireless service transaction responses, wireless device information responses, wireless device transaction responses, and the like.

The platform 261 may include a processor 264 that may be configured to receive various format communications from wireless users and/or the system cloud 252. In one aspect, the processor 264 may be implemented as a server. In this regard, the processor 264 may include a transceiver, a network switch, or the like to receive the wireless user communications from the system cloud 252. The platform 261 may further store wireless user data in the database 262. The communications from the wireless users may include a request for wireless service and wireless device transaction and information. Thereafter, the platform 261 may respond to the wireless user with the requested information and/or transaction. In this regard, the platform 261 may respond directly to the wireless users and/or may respond to the wireless users through the system cloud 252. In one aspect, the database 262 may store wireless service information responses, wireless service transaction responses, wireless device information responses, wireless device transaction responses, and the like.

The wireless device 10 may communicate to the system cloud 252 utilizing a number of different communication formats. In one aspect, the wireless device 10 may communicate via text message or short message service (SMS). The carrier 200 may implement or connect to an SMS gateway provider to facilitate SMS traffic between the wireless device 10 and the system cloud 252. In one aspect, the wireless device 10 may communicate via a Short Message Peer-to-Peer (SMPP) protocol that may provide a flexible data communication interface for the transfer of short message data between External Short Messaging Entities (ESMEs), Routing Entities (REs), a Message center, and the like. The SMPP may allow SMS messages to be transmitted from the wireless device 10 to the system cloud 252. In one aspect, the wireless device 10 may communicate over the Internet or through one of the carriers 200 through a SMS gateway (SMSC). This type of communication may be based on extensions to the European Telecommunications Standards Institute (ETSI) Global System for Mobile Communications (GSM) SMS standards and allow messaging between any mix of fixed and mobile equipment.

Figure 3:
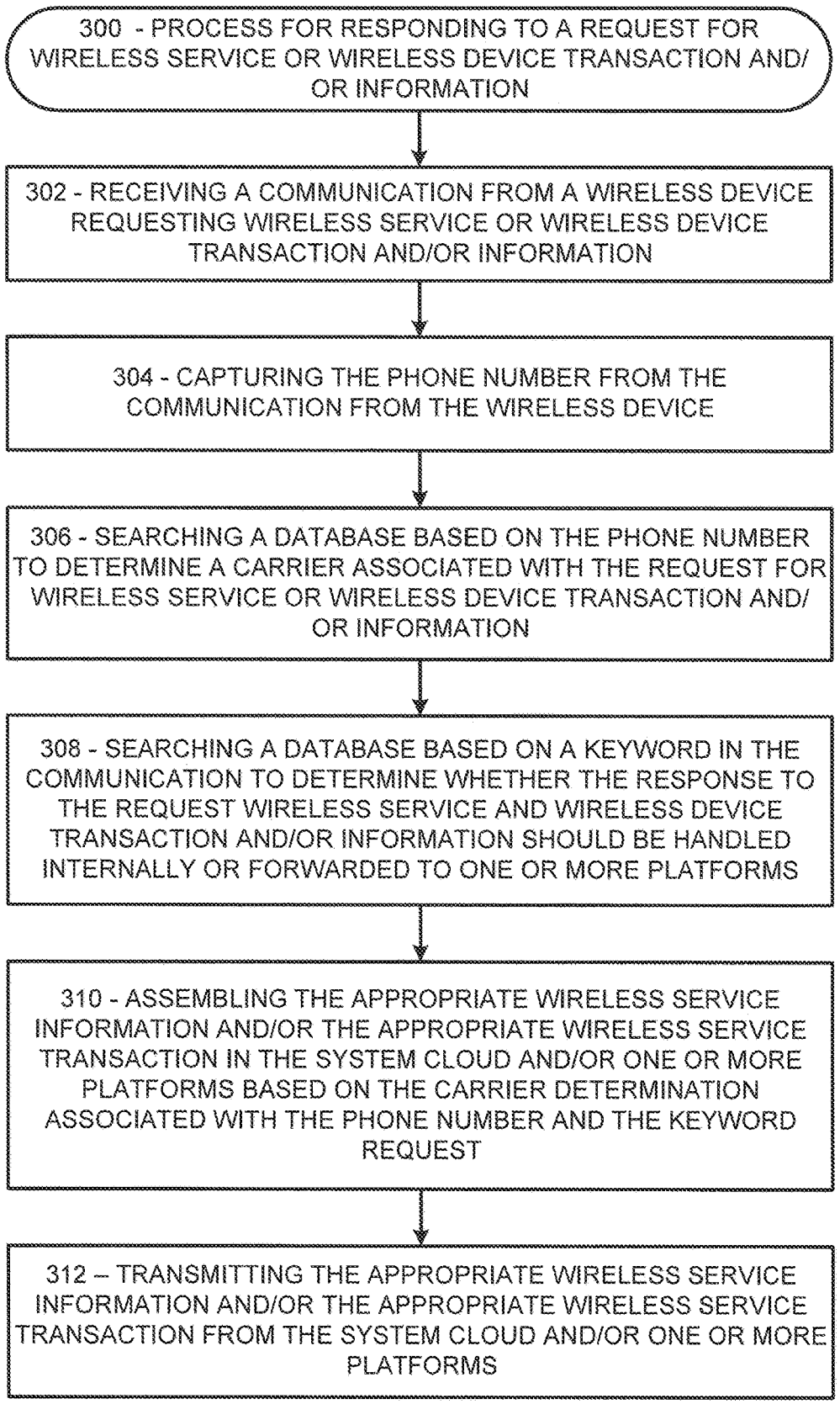
FIG. 3 illustrates a process for responding to wireless service and wireless device transaction and information requests in accordance with aspects of the disclosure.

FIG. 3 illustrates a process for responding to wireless service and wireless device transaction and information requests in accordance with aspects of the disclosure. In particular, FIG. 3 illustrates a process 300 for responding to a request for wireless service and wireless device transaction and information. The process 300 may be implemented by the system cloud 252, the processor 250, one or more platforms 261, and/or other processors.

As shown in box 302, the system 202 may receive a communication from a wireless device 10 requesting wireless service information and/or wireless device transactions. In one aspect, the user of the wireless device 10 may compose a text message having a keyword in the wireless device 10. The text message may be addressed to a particular short message code. In this regard, the short message code, also known as short codes or short numbers, may be short digit sequences. The short digit sequences may be significantly shorter than telephone numbers. The short message code may be used to address messages in SMS and/or MMS systems of the mobile network operators. Thereafter, the text message may be sent from the wireless device 10 by the user to the carrier 200 through the network operator cloud 260 to the system 202. The system 202 then they receive the communication from the wireless device 10 and advances the process 300 to box 304.

In another aspect, the user of the wireless device 10 may compose a message having a keyword in the smart speaker implementations of the wireless device 10. In this regard, the wireless user may utilize the voice recognition technology of the smart speaker implementation of the wireless device 10. The message may include a trigger word to initiate the communication. Additionally, the wireless device 10 may capture a key word, the user's phone number, and any other information needed. In some aspects, the other information in may be obtained by IVR queries and answers provided by the wireless user. Thereafter, the message may be sent from smart speaker implementation of the wireless device 10 by the user over the Internet to the system 202. The system 202 then receives the communication from the wireless device 10 and advances the process 300 to box 304. In one aspect, the wireless device 10 may provide other information. This other information may be requested directly from the wireless user, obtained from the wireless device 10, or the like. The application 22 may be implemented to provide this other information. The other information may include network information, SIM information, location information, information on applications in the wireless device 10, the type of wireless device 10, the operating system type of the wireless device 10, and the like.

In box 304, the process 300 may capture the phone number from the communication from the wireless device 10. In one aspect, if the message is a text message, the text message may include the phone number of the wireless device 10 that the wireless user has used to compose and send the text message. In another aspect, if the message is a message from a smart speaker implementation of the wireless device 10, the message may include the phone number of the wireless device 10 that the wireless user has verbally provided in the message, which is captured by the voice recognition technology of the smart speaker implementation of the wireless device 10.

In box 306, the process 300 implemented in the system cloud 252 may search the database 254, another database implemented by the system cloud 252, or an external database based on the phone number received by the communication. The database search based on phone number may determine a carrier associated with the phone number associated with the request for wireless service information and/or wireless device transactions. Once the carrier information has been determined, the process 300 advances to box 308.

In some aspects, the process 300 along with the system 202 may be configured to be carrier agnostic, device agnostic, and operating system agnostic. In other words, the process 300 and the system 202 operate irrespective of the carrier associated with the wireless device 10; the process 300 and the system 202 operate irrespective of the type of device that constitutes the wireless device 10; and the process 300 and the system 202 operate irrespective of the operating system associated with the wireless device 10.

In box 308, the process 300 may search the database 254, another database, and/or the external database based on a keyword in the communication. If the keyword received by the communication matches one or more predefined keywords, then the process 300 may determine whether the response to the request for wireless service information and/or wireless device transactions should be handled internally in the system cloud 252 or forwarded to one or more platforms 261. If the process 300 determines the response to the request for wireless service information and/or wireless device transactions should be handled internally in the system cloud 252 based on the keyword and/or the determined carrier, then the system cloud 252 may handle the request. On the other hand, if the process 300 determines the response to the request for wireless service information and/or wireless device transactions should be handled by the one or more platforms 261 based on the keyword and/or the determined carrier, then the system cloud 252 may forward the request to the appropriate platform 261. Thereafter, the process 300 may advance to box 310.

In some aspects, if the keyword received by the communication does not match one or more predefined keywords, then the process 300 may utilize artificial intelligence to associate the keyword received with one or more predefined keywords. When composing the response to the wireless user, the system 202 may include an indication that the received keyword was not an exact match and include a preface such as "we believe you are inquiring about this issue." The artificial intelligence may utilize any number of approaches including one or more of cybernetics and brain simulation, symbolic, cognitive simulation, logic-based, anti-logic, knowledge-based, sub-symbolic, embodied intelligence, computational intelligence and soft computing, machine learning and statistics, and the like.

In some aspects, if the keyword received by the communication does not match one or more predefined keywords, then the process 300 may respond to the wireless user by sending a communication to the wireless device 10. The communication may include a listing of all of the predefined keywords along with an invitation to the wireless user to resubmit their request utilizing one of the predefined keywords.

In one aspect, if the keyword received by the communication utilizes the English language, then the process 300 may respond in English. If the keyword received by the communication utilizes another language (i.e., Spanish), then the process 300 may respond in that language.

In box 310, the process 300 may include assembling the appropriate wireless service information and/or the appropriate wireless service transaction response in the system cloud 252 and/or one or more platforms 261 based on the carrier determination associated with the phone number and the keyword request. In this regard, the carrier determination that is part of box 306 may define the appropriate wireless service information and/or the appropriate wireless service transaction. More specifically, for a first carrier, a first appropriate wireless service information and/or a first appropriate wireless service transaction may be utilized; and for a second carrier, a second appropriate wireless service information and/or a second appropriate wireless service transaction may be utilized. Moreover, for any other particular carrier, a particular appropriate wireless service information and/or a particular appropriate wireless service transaction may be utilized. In other words, wireless users utilizing different carriers may require different wireless service information and/or different wireless service transaction. Accordingly, the process 300 customizes the response based on the determined carrier of the wireless user. Additionally, in some aspects, the process 300 customizes the response based on the other information. The other information may include carrier-specific data, network information, SIM information, location information, information on applications in the wireless device 10, the type of wireless device 10, the operating system type of the wireless device 10, and the like.

In box 312, the appropriate wireless service information and/or the appropriate wireless service transaction may be transmitted from the system cloud 252 and/or one or more platforms 261. In some aspects, the system cloud 252 may prepare a text message that includes the appropriate wireless service information and/or the appropriate wireless service transaction assembled in box 310. The system cloud 252 may then send the text message to the wireless device 10. Other communication types as disclosed herein are contemplated as well. If the request originated from a smart speaker implementation of the wireless device 10, the system cloud 252 may prepare a text message that includes the appropriate wireless service information and/or the appropriate wireless service transaction assembled in box 310 and may then send the text message to the wireless device 10 associated with the phone number provided by the smart speaker implementation of the wireless device 10. In another aspect, if the request originated from a smart speaker implementation of the wireless device 10, the system cloud 252 may prepare an audio message that includes the appropriate wireless service information and/or the appropriate wireless service transaction assembled in box 310 and may then send the audio message to the smart speaker implementation of the wireless device 10.

In some aspects, the platform 261 may prepare a text message that includes the appropriate wireless service information and/or the appropriate wireless service transaction assembled in box 310. The platform 261 may then send the text message to the wireless device 10. If the request originated from a smart speaker implementation of the wireless device 10, the platform 261 may prepare a text message that includes the appropriate wireless service information and/or the appropriate wireless service transaction assembled in box 310 and may then send the text message to the wireless device 10 associated with the phone number provided by the smart speaker implementation of the wireless device 10. Other communication types as disclosed herein are contemplated as well. In another aspect, if the request originated from a smart speaker implementation of the wireless device 10, the platform 261 may prepare an audio message that includes the appropriate wireless service information and/or the appropriate wireless service transaction assembled in box 310 and may then send the audio message to the smart speaker implementation of the wireless device 10. Alternatively, the platform 261 may send the information to the system cloud 252 for transmission to the wireless device consistent with the disclosure.

Figure 4:
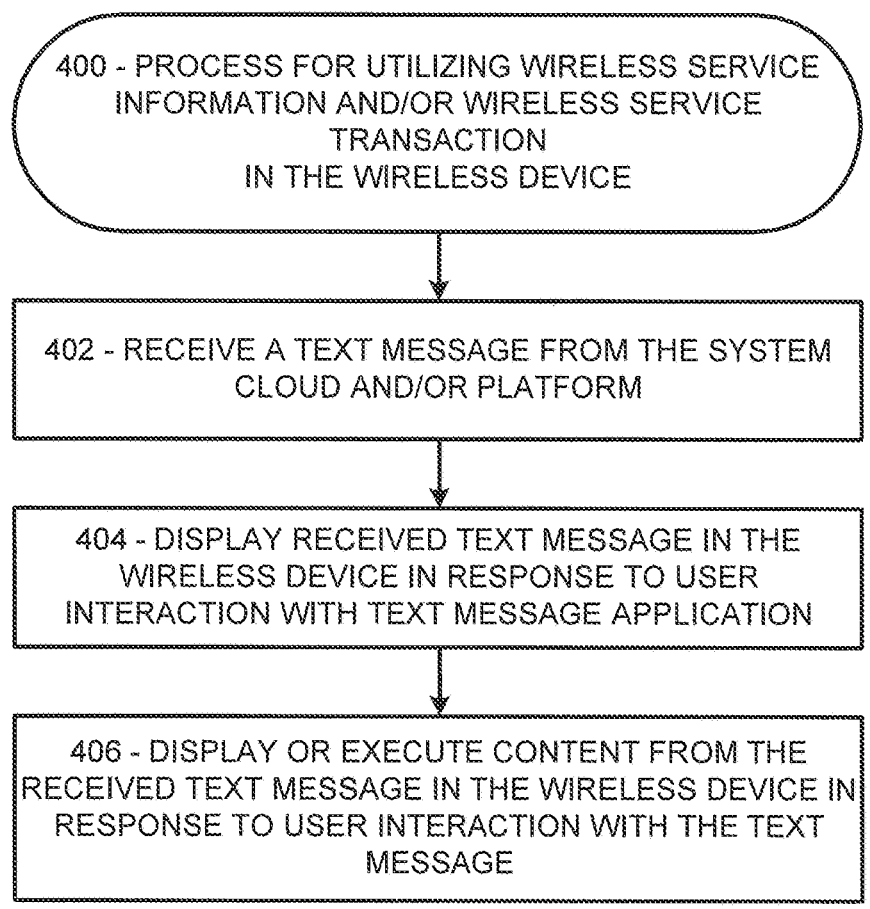
FIG. 4 illustrates a process for a wireless device to utilize a response to wireless service and wireless device transaction and information requests, in accordance with aspects of the disclosure.

FIG. 4 illustrates a process for a wireless device to utilize a response to wireless service and wireless device transaction and information requests, in accordance with aspects of the disclosure. In particular, FIG. 4 illustrates a process 400 for utilizing wireless service information and/or wireless service transactions in the wireless device 10.

Starting at box 402, the wireless device 10 may receive a text message from the system cloud 252 and/or platform 261. However, other types of communications are contemplated as well. In this regard, the communication may be any type of communication that the wireless device 10 is responsive. For example, the communication may be an email, an iMessage, a MMS, a pop up message, a page, an Enhanced Message Service (EMS) message, an instant message, a HDML (Handheld Device Markup Language) notification, a WAP (Wireless Application Protocol) Push, an Application-to-Application Messaging, or the like. For brevity, the disclosure will reference text message aspects throughout the disclosure but other types of messages including those noted above are contemplated as well and are within the spirit and scope of the disclosure.

The process 400 may continue to box 404 where the wireless device 10 may load and display the received text message in wireless device 10 in response to user interaction with the text message application. In this regard, the user may receive the text message in the wireless device 10. Thereafter, the user may interact with the text message application to open the text message.

Next, the process 400 may proceed to box 406 where the wireless device 10 may display or execute content from the received text message in the wireless device 10 in response to user interaction with the text message. In this regard, the content of the received text message may be text, a hyperlink, a file, or similar content. If the communication includes text, the text may provide the information requested by the wireless user. If the communication includes the hyperlink, selecting the hyperlink may start a browser and direct the browser to an address associated with the hyperlink to provide the information or transaction requested by the wireless user. Alternatively or additionally, the hyperlink may enable a download, a command, or the like. If the hyperlink enables a download, clicking on the hyperlink may download a file or other data for altering an aspect of wireless service or the wireless device. If the hyperlink enables a command, the command may initiate an action by the system 202. The command may be an over the air (OTA) communication, an application push, an application pull, or the like. For example, the command may be an over-the-air service provisioning (OTASP), over-the-air provisioning (OTAP), over-the-air parameter administration (OTAPA), or the like.

The communication from the wireless device 10 requesting wireless service information and/or wireless device transactions may take a number of different forms. The following are a number of particular exemplary wireless service information and/or wireless device transaction requests that the system 202 may implement.

Figure 5:
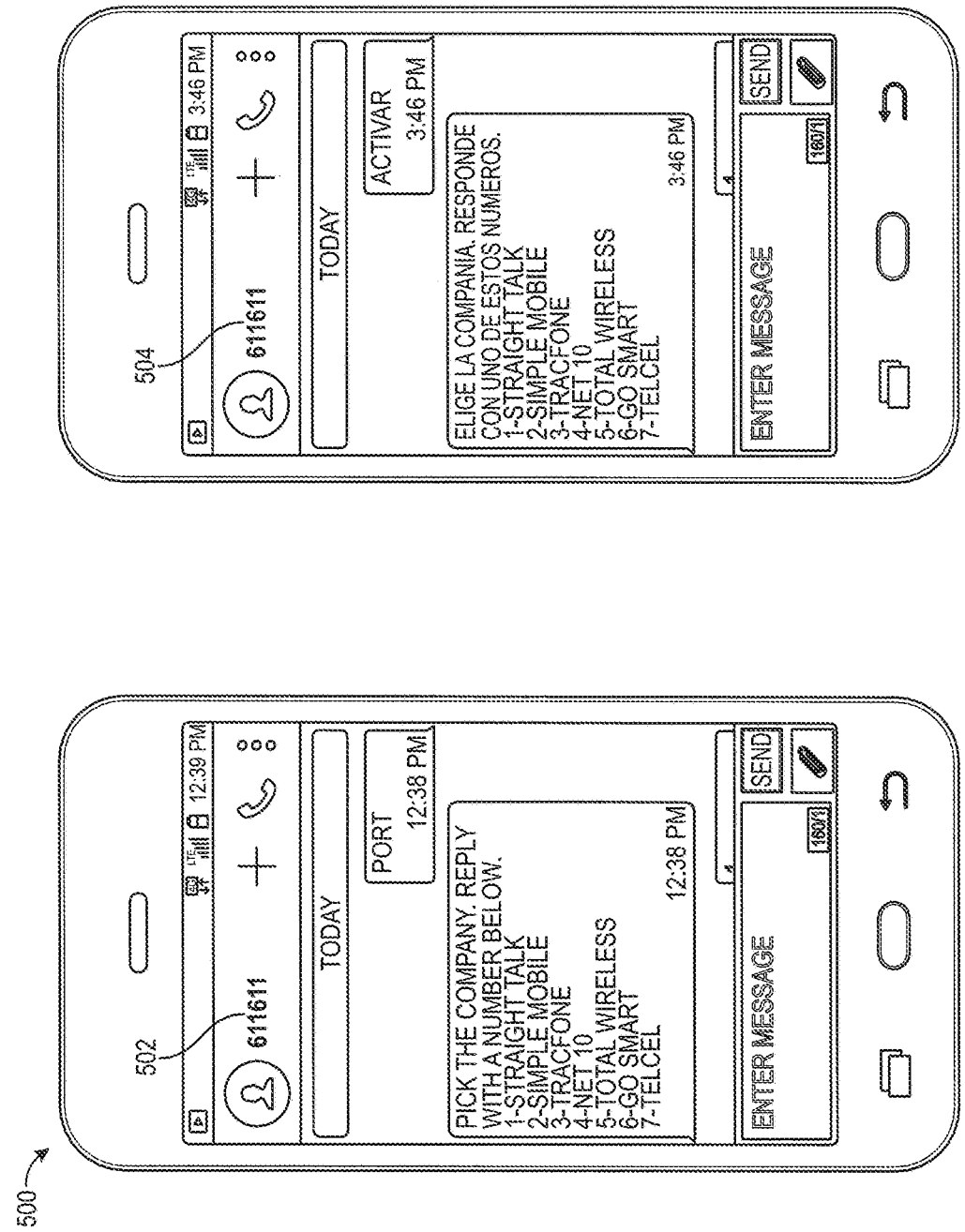
FIG. 5 and FIG. 6 illustrate screenshots associated with the wireless service and wireless device transaction and information request process for porting in accordance with aspects of the disclosure.
Figure 6:
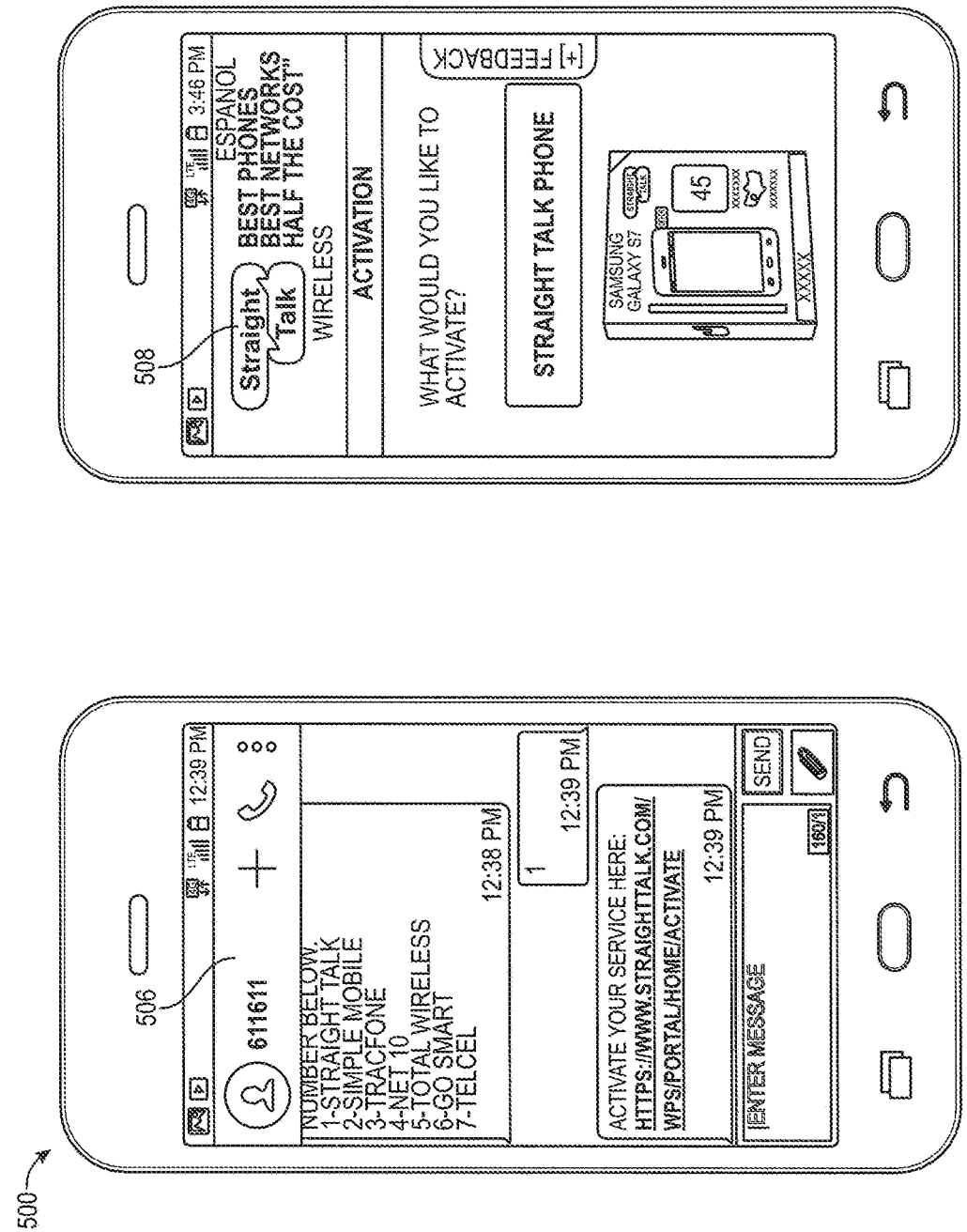

FIG. 5 and FIG. 6 illustrate screenshots associated with the wireless service and wireless device transaction and information request process for porting in accordance with aspects of the disclosure. In one aspect, the wireless service information and/or wireless device transaction may include a transaction that allows customers to port their phone number from another company or activate their service with a new number. In this regard, the user may text a keyword, such as "Port," to a particular short code. The system 202 may receive the keyword along with the phone number associated with the text message. Alternatively, if the user is utilizing a smart speaker implementation of the wireless device 10, the user may vocalize the keyword, a wireless device phone number, and any other information, and the wireless device 10 may send a communication to the system 202 with the same. In some aspects, other information may be provided as well.

In response to receiving the keyword and phone number, the system 202 may ascertain the current carrier of the wireless device 10 and prepare a responsive message either in the system cloud 252 or the platform 261. In some aspects, the responsive message may be an inquiry as to further information. In one aspect, the system cloud 252 or the platform 261 may provide a listing of various wireless carriers (MVNOs and/or MNOs) and request that the wireless user select one of the wireless carriers they desire for porting their wireless device 10. Thereafter, the system cloud 252 or the platform 261 may provide a text communication providing a hyperlink to the selected one of the wireless carriers. Once the wireless user receives the text message and the hyperlink, the wireless user may select the hyperlink and a webpage may be generated in the wireless device 10 providing detailed information on the wireless carrier requested and further detailed information to complete the porting process. In some aspects, the responsive communication may initiate the porting process.

In particular, FIG. 5 and FIG. 6 show exemplary screenshots 500 associated with the porting process. The screenshot 502 shows a text to a short code with the keyword "Port." The screenshot 502 further shows a reply from the system 202 to select a particular wireless service product. The screenshot 504 shows the same process in the Spanish language when a Spanish-language keyword has been provided by the wireless user. The screenshot 506 shows the reply to the wireless product selection from the system 202 that may include a hyperlink. The screenshot 508 shows a web browser and webpage generated consistent with the selection of the hyperlink by the wireless user.

Figure 7:
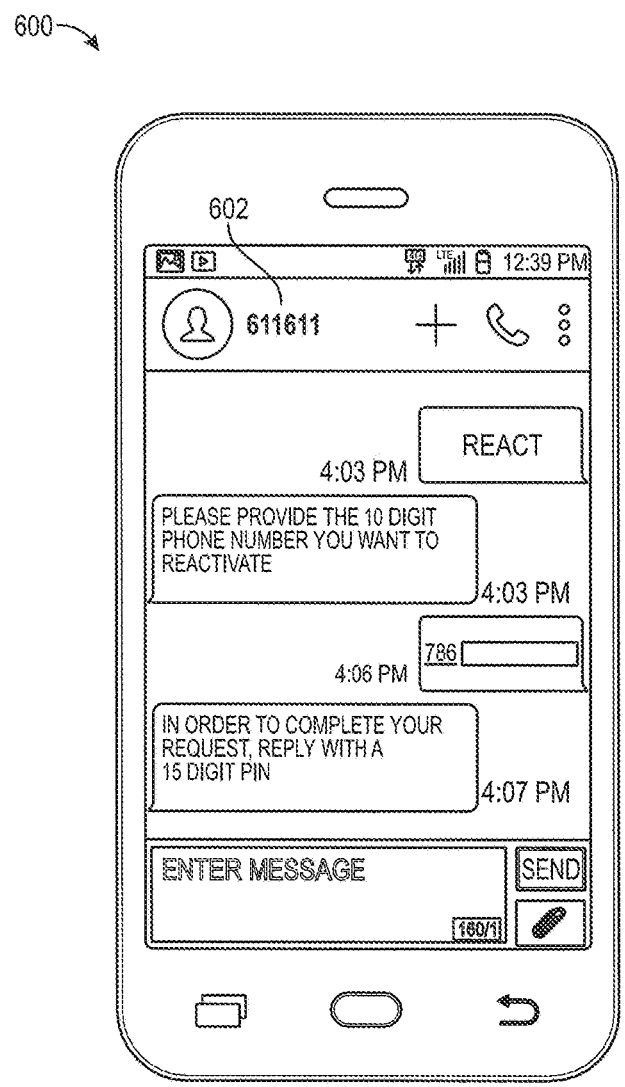
FIG. 7 illustrates a screenshot associated with the wireless service and wireless device transaction and information requests process for reactivating in accordance with aspects of the disclosure.

FIG. 7 illustrates a screenshot associated with the wireless service and wireless device transaction and information requests process for reactivating in accordance with aspects of the disclosure. In one aspect, the wireless service information and/or wireless device transaction may include a transaction that allows the customer to reactivate their service from any active wireless device 10. In this regard, the user may text a keyword, such as "React" or "Reactivate" to a particular short code. The system 202 may receive the keyword along with the phone number associated with the text message. Alternatively, if the user is utilizing a smart speaker implementation of the wireless device 10, the user may vocalize the keyword, a wireless device phone number, and any other information, and the wireless device 10 may send a communication to the system 202 with the same.

In response to receiving the keyword and phone number, the system 202 may ascertain the current carrier of the wireless device 10 and prepare a responsive message either in the system cloud 252 or the platform 261. In some aspects, the responsive message may be an inquiry as to further information. In one aspect, the system cloud 252 or the platform 261 may request confirmation of the phone number to be reactivated. Thereafter, the system cloud 252 or the platform 261 may provide a text communication requesting payment for wireless service, a PIN (personal identification number) associated with an amount of prepaid wireless service (airtime card) to add prepaid wireless service to the wireless device, or the like. Once the wireless user provides the payment, PIN, or the like in a responsive text message, the system 202 may reactivate wireless service for the wireless device 10. Additionally, the system 202 may associate the payment or added prepaid wireless service to an account associated with the wireless device 10.

In particular, FIG. 7 shows exemplary screenshots 600 associated with a reactivation process. The screenshot 602 shows a text to a short code with the keyword "React." The screenshot 602 further shows a reply from the system 202 to provide a phone number. The screenshot 602 further shows an additional reply from the system 202 requesting a personal identification number.

FIG. 8 illustrates screenshots associated with the wireless service and wireless device transaction and information requests process for buying wireless service in accordance with aspects of the disclosure. In one aspect, the wireless service information and/or wireless device transaction may include a transaction that allows customers to buy a service plan using a credit card. In this regard, the user may text a keyword, such as "Buy" to a particular short code. The system 202 may receive the keyword along with the phone number associated with the text message. Alternatively, if the user is utilizing a smart speaker implementation of the wireless device 10, the user may vocalize the keyword, a wireless device phone number, and any other information, and the wireless device 10 may send a communication to the system 202 with the same that includes the ability to enter a credit card or debit card number.

In response to receiving the keyword and phone number, the system 202 may ascertain the current carrier of the wireless device 10 and prepare a responsive message either in the system cloud 252 or the platform 261. Thereafter, the system cloud 252 or the platform 261 may provide a text communication providing a hyperlink to the selected one of the wireless carriers. Once the wireless user receives the text message and the hyperlink, the wireless user may select the hyperlink and a webpage may be generated in the wireless device 10 providing detailed information on buying wireless service from the wireless carrier requested. In some aspects, the responsive communication may initiate the purchase process.

In particular, FIG. 8 shows exemplary screenshots 800 associated with the buying process. The screenshot 802 shows a text to a short code with the keyword "buy." The screenshot 802 shows the same process in the Spanish language. The screenshot 802 shows the reply from the system 202 that may include a hyperlink. The screenshot 804 shows a web browser and webpage generated consistent with the selection of the hyperlink by the wireless user that includes the ability to enter a credit card or debit card number.

FIG. 9 illustrates a screenshot associated with the wireless service and wireless device transaction and information requests process for SIM installation in accordance with aspects of the disclosure. In one aspect, the wireless service information and/or wireless device transaction may include information and instructions on how to install a SIM Card into the wireless device 10. In this regard, the user may text a keyword, such as "SIM" to a particular short code. The system 202 may receive the keyword along with the phone number associated with the text message. Alternatively, if the user is utilizing a smart speaker implementation of the wireless device 10, the user may vocalize the keyword, a wireless device phone number, and any other information, and the wireless device 10 may send a communication to the system 202 with the same. In some aspects, the other information may be provided as well to the system 202.

In response to receiving the keyword and phone number, the system 202 may ascertain the current carrier of the wireless device 10 and prepare a responsive message either in the system cloud 252 or the platform 261. In some aspects, the system 202 may also be able to ascertain the type of wireless device 10 the customer is inquiring about. Thereafter, the system cloud 252 or the platform 261 may provide a text communication providing a hyperlink providing information on how to install a SIM. In some aspects, the hyperlink may be customized for the particular wireless device 10. Once the wireless user receives the text message and the hyperlink, the wireless user may select the hyperlink and a webpage may be generated in the wireless device 10 providing detailed information on installing the SIM. In one aspect, the installation instructions may include video-based instructions.

In particular, FIG. 9 shows exemplary screenshot 900 associated with a SIM installation information process. The screenshot 902 shows a text to a short code with the keyword "SIM." The screenshot 902 shows the reply from the system 202 that may include a hyperlink to video-based instructions.

FIG. 10 illustrates a screenshot associated with the wireless service and wireless device transaction and information requests process for transferring in accordance with aspects of the disclosure. In one aspect, the wireless service information and/or wireless device transaction may include a transaction that provides instructions on how to transfer the customer's mobile number to another phone. In this regard, the user may text a keyword, such as "Transfer" to a particular short code. The system 202 may receive the keyword along with the phone number associated with the text message. Alternatively, if the user is utilizing a smart speaker implementation of the wireless device 10, the user may vocalize the keyword, a wireless device phone number, and any other information, and the wireless device 10 may send a communication to the system 202 with the same.

In response to receiving the keyword and phone number, the system 202 may ascertain the current carrier of the wireless device 10 and prepare a responsive message either in the system cloud 252 or the platform 261. In some aspects, the responsive message may be an inquiry as to further information. In one aspect, the system cloud 252 or the platform 261 may request information on the ESN (Electronic Serial Number), IMEI (International Mobile Equipment Identity), and/or MEID (Mobile Equipment Identifier) number of the new device. In one aspect, the system cloud 252 or the platform 261 may automatically obtain information on the ESN, the IMEI, and/or the MEID number of the new device. Thereafter, the system cloud 252 or the platform 261 may transfer wireless service to the new wireless device 10.

In particular, FIG. 10 shows exemplary screenshot 1000 associated with a transfer process. The screenshot 1002 shows a text to a short code with the keyword "Transfer." The screenshot 1002 further shows a reply from the system 202 to provide certain wireless device information.

Figure 11:
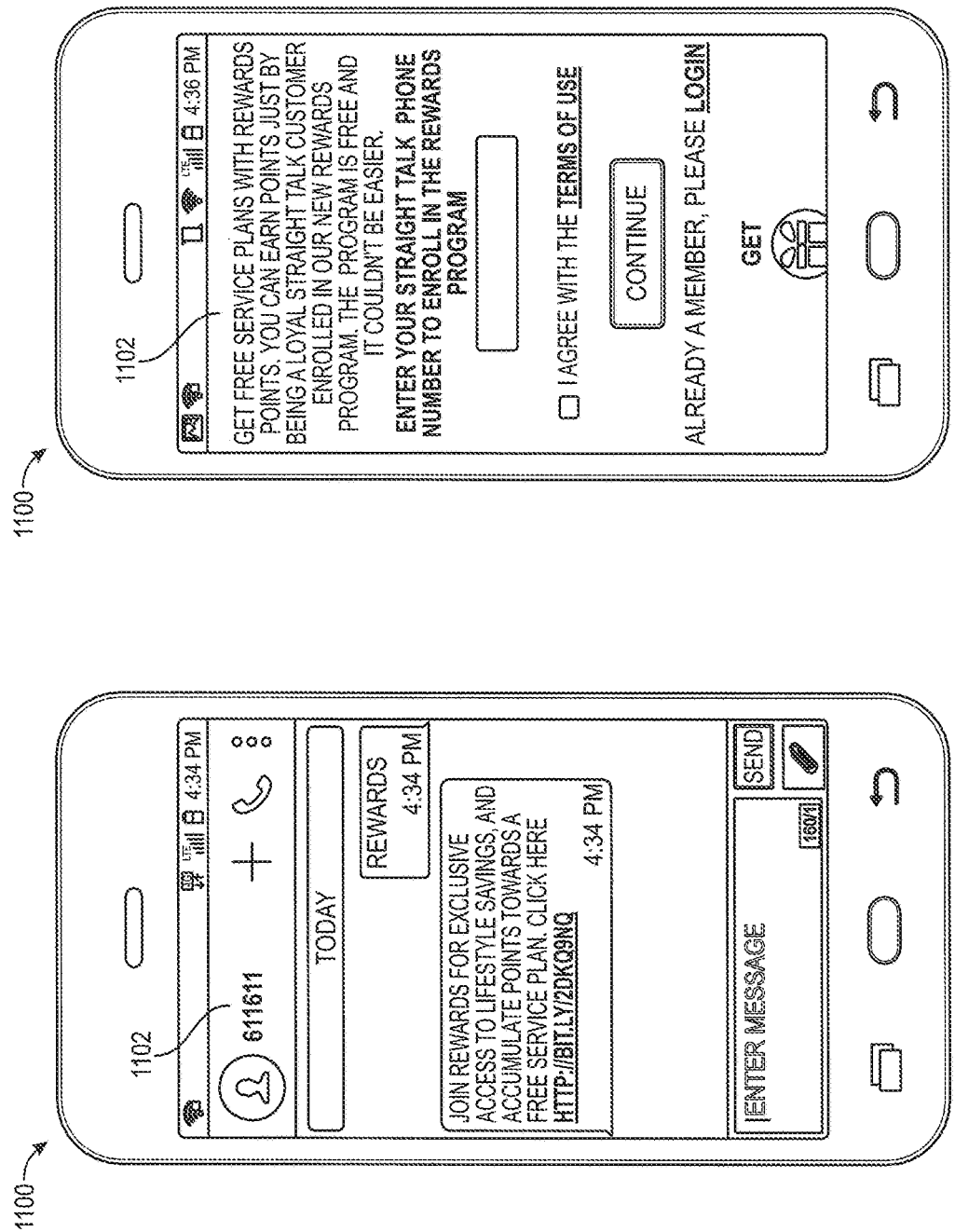
FIG. 11 illustrates screenshots associated with the wireless service and wireless device transaction and information requests process for a loyalty reward program in accordance with aspects of the disclosure.
Figure 11:
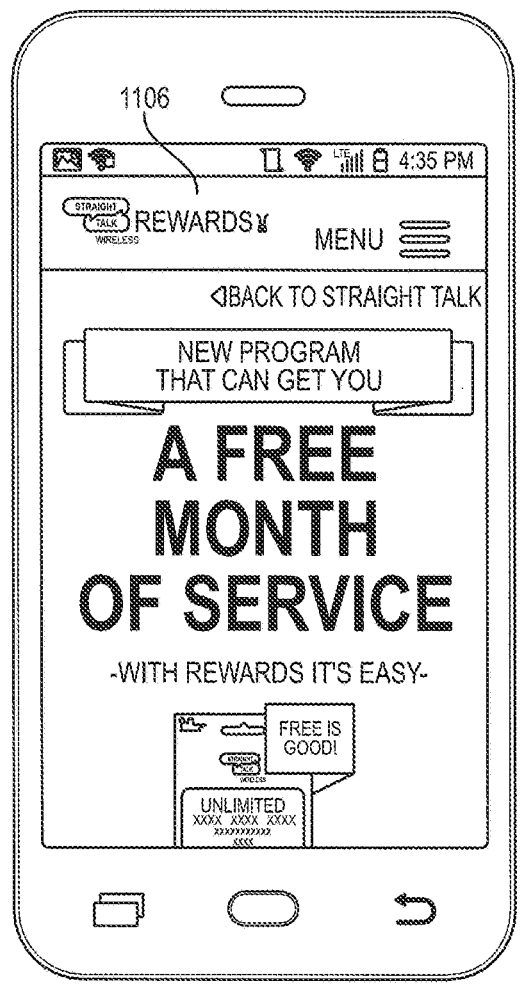

FIG. 11 illustrates screenshots associated with the wireless service and wireless device transaction and information requests process for a loyalty reward program in accordance with aspects of the disclosure. In one aspect, the wireless service information and/or wireless device transaction may include an information request that provides instructions on how to access a Loyalty Rewards Program. In this regard, the user may text a keyword, such as "Reward" to a particular short code. The system 202 may receive the keyword along with the phone number associated with the text message. Alternatively, if the user is utilizing a smart speaker implementation of the wireless device 10, the user may vocalize the keyword, a wireless device phone number, and any other information, and the wireless device 10 may send a communication to the system 202 with the same.

In response to receiving the keyword and phone number, the system 202 may ascertain the current carrier of the wireless device 10 and prepare a responsive message either in the system cloud 252 or the platform 261. Thereafter, the system cloud 252 or the platform 261 may provide a text communication providing a link to the loyalty rewards program associated with the particular wireless carrier associated with the phone number. Once the wireless user receives the text message and a link, the wireless user may select the link and a webpage may be generated in the wireless device 10 providing detailed information on the loyalty rewards program.

In particular, 11 shows exemplary screenshots 1100 associated with a loyalty rewards process. The screenshot 1102 shows a text to a short code with the keyword "Rewards." The screenshot 1102 shows the reply from the system 202 that may include a hyperlink. The screenshot 1104 shows a web browser and webpage generated consistent with the selection of the hyperlink by the wireless user. The screenshot 1104 further illustrates a request for a phone number and a request to agree with terms of use. The screenshot 1106 is the resulting webpage after providing the phone number and agreeing to the terms of use.

Figure 12:
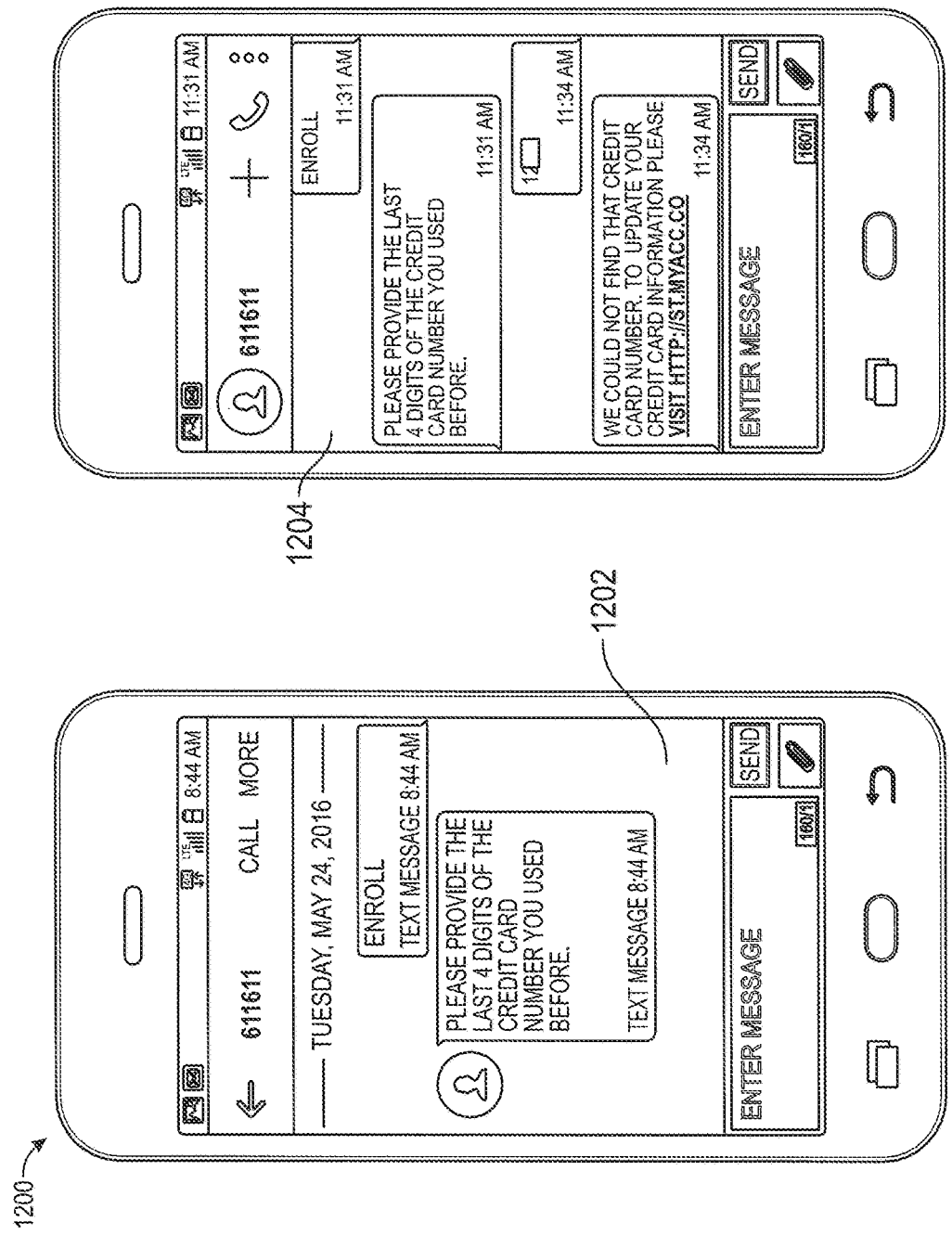
FIG. 12 illustrates screenshots associated with the wireless service and wireless device transaction and information requests process for wireless service enrollment in accordance with aspects of the disclosure.

FIG. 12 illustrates screenshots associated with the wireless service and wireless device transaction and information requests process for wireless service enrollment in accordance with aspects of the disclosure. In one aspect, the wireless service information and/or wireless device transaction may include an automatic payment transaction. In this regard, the user may text a keyword, such as "Enroll," to a particular short code. The system 202 may receive the keyword along with the phone number associated with the text message. Alternatively, if the user is utilizing a smart speaker implementation of the wireless device 10, the user may vocalize the keyword, a wireless device phone number, and any other information, and the wireless device 10 may send a communication to the system 202 with the same.

In response to receiving the keyword and phone number, the system 202 may ascertain the current carrier of the wireless device 10 and prepare a responsive message either in the system cloud 252 or the platform 261. In some aspects, the responsive message may be an inquiry as to details of a previously used credit card number for the associated wireless service. The user can then reply to the text message with the details of the previously used credit card number (i.e., last 4 digits of the previously used credit card). Thereafter, the system cloud 252 or the platform 261 may enroll the wireless service in an automatic refill or automatic debit process to automatically charge the credit card from time to time to pay for the wireless service.

In particular, FIG. 12 shows exemplary screenshots 1200 associated with an enrollment process. The screenshot 1202 shows a text to a short code with the keyword "Enroll." The screenshot 1202 further shows a reply from the system 202 to provide the last 4 digits of the credit card number previously used. The screenshot 1204 shows an error message should the credit card number not be found in a database of the system 202.

These specific examples are merely exemplary. Many other wireless service and wireless device transaction and information requests may be utilized consistent with the disclosure. For example, the wireless device transaction and information requests may include information on obtaining current data usage or wireless service usage including forecasts on when the wireless service may be depleted. The wireless device transaction and information requests may include information on obtaining compatibility between a wireless device and various accessories. The wireless device transaction and information requests may include information on obtaining wireless device tutorials and manuals. The wireless device transaction and information requests may include information on obtaining retailers or dealers based on zip code or current wireless device location determined from the location determination device 30. The wireless device transaction and information requests may include information on obtaining various wireless device and wireless network settings such as APN (access point name) settings. The wireless device transaction and information requests may include information on obtaining wireless service instructions including voicemail, international long-distance, and the like. The wireless device transaction and information requests may include information on obtaining tips on using the wireless device and managing wireless service usage. The wireless device transaction and information requests may include information on obtaining wireless service information. The wireless device transaction and information requests may include information on obtaining specific applications. The wireless device transaction and information requests may include information on obtaining information on eligibility for various wireless carriers.

Thus, the disclosure as described a system, method, and process for handling wireless service and wireless device transaction and information requests based on text message short codes and/or other communication formats. The disclosed subject matter may allow wireless providers to provide wireless users of wireless networks and carriers easy to access information and transactions that will improve the experience of users of wireless service plans.

Further in accordance with various aspects of the disclosure, the methods described herein are intended for operation with dedicated hardware implementations including, but not limited to processors, microprocessors, wireless device chipsets, PCs, PDAs, SIM cards, semiconductors, application specific integrated circuits (ASIC), programmable logic arrays, cloud computing devices, and other hardware devices constructed to implement the methods described herein.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

According to an example, the global navigation satellite system (GNSS) may include a device and/or system that may estimate its location based, at least in part, on signals received from space vehicles (SVs). In particular, such a device and/or system may obtain "pseudorange" measurements including approximations of distances between associated SVs and a navigation satellite receiver. In a particular example, such a pseudorange may be determined at a receiver that is capable of processing signals from one or more SVs as part of a Satellite Positioning System (SPS). Such an SPS may include, for example, a Global Positioning System (GPS), Galileo, Glonass, to name a few, or any SPS developed in the future. To determine its location, a satellite navigation receiver may obtain pseudorange measurements to three or more satellites as well as their positions at time of transmitting. Knowing the SV orbital parameters, these positions can be calculated for any point in time. A pseudorange measurement may then be determined based, at least in part, on the time a signal travels from an SV to the receiver, multiplied by the speed of light. While techniques described herein may be provided as implementations of location determination in GPS and/or Galileo types of SPS as specific illustrations according to particular examples, it should be understood that these techniques may also apply to other types of SPS, and that claimed subject matter is not limited in this respect.

Aspects of the disclosure may include a server executing an instance of an application or software configured to accept requests from a client and giving responses accordingly. The server may run on any computer including dedicated computers. The computer may include at least one processing element, typically a central processing unit (CPU), and some form of memory. The processing element may carry out arithmetic and logic operations, and a sequencing and control unit may change the order of operations in response to stored information. The server may include peripheral devices that may allow information to be retrieved from an external source, and the result of operations saved and retrieved. The server may operate within a client-server architecture. The server may perform some tasks on behalf of clients. The clients may connect to the server through the network on a communication channel as defined herein. The server may use memory with error detection and correction, redundant disks, redundant power supplies and so on.

The disclosure may include communication channels 220 that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), W-CDMA (Wideband Code-Division Multiple Access), Wireless Fidelity (Wi-Fi), Bluetooth, Long Term Evolution (LTE), 4G, 5G, EVolution-Data Optimized (EVDO) and/or the like, and/or a combination of two or more thereof.

The disclosure may be implemented in any type of computing devices or processor, such as, e.g., a microprocessor, wireless device chipset, a desktop computer, personal computer, a laptop/mobile computer, a personal data assistant (PDA), a mobile phone, a tablet computer, cloud computing device, and the like, with wired/wireless communications capabilities via the communication channels 220.

In an aspect, the disclosure may be implemented in any type of mobile smartphones that are operated by any type of advanced mobile data processing and communication operating system, such as, e.g., an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

It should also be noted that the software implementations of the disclosure as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

The term talk, voice, or voice calls as utilized herein may include voice calls defined by 3GPP (3rd Generation Partnership Project) with Voice Call Continuity (VCC) specifications in order to describe how a voice call can be persisted, as a mobile phone moves between circuit switched and packet switched radio domains (3GPP TS 23.206).

The term data as utilized herein includes mobile broadband or wireless Internet access delivered through mobile phone towers over a communication channel as defined herein to computers, mobile phones, wireless devices, and other digital devices as defined herein using portable modems. Some mobile services allow more than one device to be connected to the Internet using a single cellular connection using a process called tethering.

As used herein interactive voice response (IVR) is a technology that allows a computer to interact with humans through the use of voice and DTMF tones input via keypad. In telecommunications, IVR allows customers to interact with a host system via a telephone keypad or by voice recognition, after which they can service their own inquiries by following the IVR dialogue. IVR systems can respond with prerecorded or dynamically generated audio to further direct users on how to proceed. IVR applications can be used to control almost any function where the interface can be broken down into a series of simple interactions.

While the device, system, and method have been described in terms of what are presently considered to be specific aspects, the disclosure need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

The invention claimed is:

1. A system for handling wireless service and wireless device transaction and information requests, the system comprising:
    a database configured to store wireless service information responses, wireless service transaction responses, wireless device information responses, and wireless device transaction responses;
    at least one processor configured to receive a communication over a network from a wireless device, the communication comprising a keyword, the keyword is composed by a user of the wireless device, the keyword is sent by the wireless device to the at least one processor in response to the user of the wireless device, and the keyword is associated with and defining at least one of the following: a wireless service information request, a wireless service transaction request, a wireless device information request, and a wireless device transaction request;
    the at least one processor further configured to analyze the keyword input by the user of the wireless device and sent by the user from the wireless device to the at least one processor in the communication from the wireless device, determine whether the keyword matches a predefined keyword, and determine based on the keyword matching the predefined keyword a response to the wireless service information request, the wireless service transaction request, the wireless device information request, or the wireless device transaction request;
    the at least one processor further configured to obtain from the database the response, based at least on the keyword, to the wireless service information request, the wireless service transaction request, the wireless device information request, or the wireless device transaction request; and
    the at least one processor further configured to transmit a communication over a network to the wireless device for output from the wireless device, the communication includes the response to the wireless device, the response based at least on the keyword and being associated to the wireless service information request, the wireless service transaction request, the wireless device information request, or the wireless device transaction request,
    wherein the output comprises at least one of the following: displaying the response on a display of the wireless device and generating an audio message on a speaker of the wireless device that comprises the response;
    wherein the at least one processor is further configured to analyze the keyword input by the user of the wireless device utilizing artificial intelligence;
    wherein the at least one processor is further configured to determine whether the keyword does not match a predefined keyword and transmit a message;
    wherein the message includes a listing of all predefined keywords instructing the user to resubmit a request utilizing one of the predefined keywords; and
    wherein all of the predefined keywords include a wireless service information request, a wireless service transaction request, a wireless device information request, and a wireless device transaction request.

2. The system of claim 1,
    wherein the response is based at least on the keyword and the keyword being associated to the wireless service information request, the wireless service transaction request, the wireless device information request, or the wireless device transaction request;
    wherein the wireless device comprises a wireless phone;
    wherein the communication from the wireless device comprises a text message composed by the user with the wireless device and addressed by the user to a short code; and
    wherein the communication to the wireless device comprises a text message.

3. The system of claim 1,
    wherein the at least one processor is further configured to analyze the keyword input by the user of the wireless device and sent by the user from the wireless device to the at least one processor in the communication from the wireless device, determine whether the keyword does not match a predefined keyword, transmit a message communicating that the keyword does not match a predefined keyword, and associate based on the keyword a predefined keyword;
    wherein the wireless service information request, the wireless service transaction request, the wireless device information request, or the wireless device transaction request comprise at least one of the following:
    a request for a transaction that ports a phone number of the wireless device from one wireless service provider to another wireless service provider;
    a request for a transaction that activates a new phone number for the wireless device;
    a request for a transaction to transfer from one wireless service provider to another wireless service provider;
    a request for a transaction that reactivates wireless service for a wireless device;
    a request for a transaction to purchase a wireless service plan;
    a request for information and instructions on how to install a SIM card into the wireless device;
    a request for instructions on how to transfer a mobile number to another wireless device;
    a request for information that provides instructions on how to access a loyalty rewards program; or
    a request for a transaction for an automatic payment wireless service plan; and
    wherein the at least one processor is further configured to analyze the communication from the wireless device and determine a phone number associated with the wireless device.

4. The system of claim 1, further comprising:
    the database further configured to store current wireless carrier information for a plurality of wireless devices;
    the at least one processor further configured to analyze the communication from the wireless device and determine a phone number associated with the wireless device; and the at least one processor further configured to query the database based on the phone number associated with the wireless device to determine the wireless carrier of the wireless device, wherein the wireless device comprises at least one of the following: a wireless phone and a smart speaker.

5. The system of claim 4,
wherein the communication from the wireless device comprises a text message composed by the user and addressed to a short code;
wherein the communication to the wireless device comprises a text message;
wherein the communication includes the response to the wireless device and the response further includes at least one of the following: a hyperlink and a data file; and
wherein the response is based at least on the keyword and being associated to the wireless service information request, the wireless service transaction request, the wireless device information request, or the wireless device transaction request.

6. The system of claim 4, further comprising:
the at least one processor further configured to analyze the keyword in the communication from the wireless device and the determined wireless carrier to determine a response to the wireless service information request, the wireless service transaction request, the wireless device information request, or the wireless device transaction request;
the at least one processor further configured to obtain from the database a response, based at least on the keyword and the determined wireless carrier, to the wireless service information request, the wireless service transaction request, the wireless device information request, or the wireless device transaction request; and
the at least one processor further configured to transmit a communication to the wireless device that includes the response to the wireless device, the response being associated to the wireless service information request, the wireless service transaction request, the wireless device information request, or the wireless device transaction request,
wherein the communication includes the response to the wireless device and the response further includes at least one of the following: a hyperlink and a data file; and
wherein the response is based at least on the keyword and being associated to the wireless service information request, the wireless service transaction request, the wireless device information request, or the wireless device transaction request.

7. The system of claim 6,
wherein the wireless device comprises a smart speaker that includes at least a processor, a speaker, a microphone, and a transceiver;
wherein the processor is configured to implement voice recognition functionality; and
wherein the communication from the smart speaker comprises the keyword captured by the voice recognition functionality.

8. The system of claim 1,
wherein the at least one processor comprises a first processor and a second processor;
wherein the first processor is configured to analyze the keyword in the communication from the wireless device and determine if the response should be handled by the first processor or handled by the second processor;
wherein either the first processor or the second processor obtain from the database, based on the analysis of the first processor, the response, based at least on the keyword, to the wireless service information request, the wireless service transaction request, the wireless device information request, or the wireless device transaction request; and
wherein the wireless device comprises at least one of the following: a wireless phone and a smart speaker.

9. The system of claim 1,
wherein the response is based at least on the keyword and the keyword being associated to the wireless service information request, the wireless service transaction request, the wireless device information request, or the wireless device transaction request;
wherein the system is implemented by a Mobile Virtual Network Operator;
wherein the wireless device connects to one of a plurality of Mobile Network Operator networks; and
wherein the wireless device comprises at least one of the following: a wireless phone and a smart speaker.

10. A system for handling wireless service and wireless device transaction and information requests, the system comprising:
a database configured to store wireless service information responses, wireless service transaction responses, wireless device information responses, and wireless device transaction responses;
at least one processor configured to receive a communication over a network from a wireless device, the communication comprising a keyword, the keyword is composed by a user of the wireless device, the keyword is sent by the wireless device to the at least one processor in response to the user of the wireless device, and the keyword is associated with and defining at least one of the following: a wireless service information request, a wireless service transaction request, a wireless device information request, and a wireless device transaction request;
the at least one processor further configured to analyze the keyword input by the user of the wireless device and sent by the user from the wireless device to the at least one processor in the communication from the wireless device, determine whether the keyword matches a predefined keyword, and determine based on the keyword matching the predefined keyword a response to the wireless service information request, the wireless service transaction request, the wireless device information request, or the wireless device transaction request;
the at least one processor further configured to obtain from the database the response, based at least on the keyword, to the wireless service information request, the wireless service transaction request, the wireless device information request, or the wireless device transaction request; and
the at least one processor further configured to transmit a communication over a network to the wireless device for output from the wireless device, the communication includes the response to the wireless device, the response based at least on the keyword and being associated to the wireless service information request, the wireless service transaction request, the wireless device information request, or the wireless device transaction request, wherein the output comprises at least one of the following: displaying the response on a display of the wireless device and generating an audio message on a speaker of the wireless device that comprises the response;

wherein the at least one processor is further configured to analyze the keyword input by the user of the wireless device utilizing artificial intelligence;

wherein the wireless device comprises a smart speaker that includes at least a processor, a speaker, a microphone, and a transceiver;

wherein the processor is configured to implement voice recognition functionality;

wherein the communication from the smart speaker comprises the keyword from the user captured by the microphone and recognized by the processor implementing the voice recognition functionality;

wherein the at least one processor is further configured to determine whether the keyword does not match a predefined keyword and transmit a message;

wherein the message includes a listing of all predefined keywords instructing the user to resubmit a request utilizing one of the predefined keywords; and wherein all of the predefined keywords include a wireless service information request, a wireless service transaction request, a wireless device information request, and a wireless device transaction request.

11. A non-transitory computer readable medium executed by at least one processor to perform a process for handling wireless service and wireless device transaction and information requests, the process comprising:

storing in a database wireless service information responses, wireless service transaction responses, wireless device information responses, and wireless device transaction responses;

receiving with at least one processor a communication over a network from a wireless device, the communication comprising a keyword, the keyword is composed by a user of the wireless device, the keyword is sent by the wireless device to the at least one processor in response to the user of the wireless device, and the keyword is associated with and defining at least one of the following: a wireless service information request, a wireless service transaction request, a wireless device information request, and a wireless device transaction request;

analyzing with the at least one processor the keyword input by the user of the wireless device and sent by the user from the wireless device to the at least one processor in the communication from the wireless device to determine whether the keyword matches a predefined keyword, and determining based on the keyword matching the predefined keyword a response to the wireless service information request, the wireless service transaction request, the wireless device information request, or the wireless device transaction request;

obtaining with the at least one processor from the database the response, based at least on the keyword, to the wireless service information request, the wireless service transaction request, the wireless device information request, or the wireless device transaction request; and transmitting by the at least one processor a communication over a network to the wireless device for output from the wireless device, the communication that includes the response to the wireless device, the response based at least on the keyword and being associated to the wireless service information request, the wireless service transaction request, the wireless device information request, or the wireless device transaction request, wherein the output comprises at least one of the following: displaying the response on a display of the wireless device and generating an audio message on a speaker of the wireless device that comprises the response;

wherein the at least one processor is further configured to analyze the keyword input by the user of the wireless device utilizing artificial intelligence;

wherein the at least one processor is further configured to determine whether the keyword does not match a predefined keyword and transmit a message;

wherein the message includes a listing of all predefined keywords instructing the user to resubmit a request utilizing one of the predefined keywords; and wherein all of the predefined keywords include a wireless service information request, a wireless service transaction request, a wireless device information request, and a wireless device transaction request.

12. The non-transitory computer readable medium of claim 11, wherein the at least one processor is further configured to analyze the keyword input by the user of the wireless device and sent by the user from the wireless device to the at least one processor in the communication from the wireless device, determine whether the keyword does not match a predefined keyword, transmit a message communicating that the keyword does not match a predefined keyword, and associate based on the keyword a predefined keyword;

wherein the communication from the wireless device comprises a text message composed by the user with the wireless device and addressed by the user to a short code;

wherein the communication over the network to the wireless device comprises a text message; and wherein the at least one processor is further configured to analyze the communication from the wireless device and determine a phone number associated with the wireless device.

13. The non-transitory computer readable medium of claim 11, wherein the response is based at least on the keyword and the keyword being associated to the wireless service information request, the wireless service transaction request, the wireless device information request, or the wireless device transaction request;

wherein the wireless device comprises a wireless phone;

wherein the communication from the wireless device comprises a text message composed by the user and addressed to a short code;

wherein the communication to the wireless device comprises a text message; and wherein the at least one processor further configured to analyze the communication from the wireless device and determine a phone number associated with the wireless device.

14. The non-transitory computer readable medium of claim 11, wherein the wireless device comprises a smart speaker that includes at least a processor, a speaker, a microphone, and a transceiver;

wherein the processor is configured to implement voice recognition functionality; and wherein the communication from the smart speaker comprises the keyword from the user captured by the microphone and recognized by the processor implementing the voice recognition functionality.

15. The non-transitory computer readable medium of claim 11, wherein the at least one processor comprises a first processor and a second processor;

wherein the first processor is configured to analyze the keyword in the communication from the wireless device and determine if the response should be handled by the first processor or handled by the second processor;

wherein either the first processor or the second processor obtain from the database, based on the analysis of the first processor, the response, based at least on the keyword, to the wireless service information request, the wireless service transaction request, the wireless device information request, or the wireless device transaction request; and wherein the wireless device comprises at least one of the following: a wireless phone and a smart speaker.

16. The non-transitory computer readable medium of claim 11, further comprising:

storing in the database current wireless carrier information for a plurality of wireless devices;

analyzing with the at least one processor the communication from the wireless device and determine a phone number associated with the wireless device; and querying with the at least one processor the database based on the phone number associated with the wireless device to determine a wireless carrier of the wireless device, wherein the communication includes the response to the wireless device and the response further includes at least one of the following: a hyperlink and a data file; and wherein the response is based at least on the keyword and being associated to the wireless service information request, the wireless service transaction request, the wireless device information request, or the wireless device transaction request.

17. The non-transitory computer readable medium of claim 16, further comprising:

analyzing with the at least one processor the keyword in the communication from the wireless device and the determined wireless carrier to determine a response to the wireless service information request, the wireless service transaction request, the wireless device information request, or the wireless device transaction request;

obtaining with the at least one processor from the database a response, based at least on the keyword and the determined wireless carrier, to the wireless service information request, the wireless service transaction request, the wireless device information request, or the wireless device transaction request; and transmitting by the at least one processor a communication to the wireless device that includes the response to the wireless device, the response being associated to the wireless service information request, the wireless service transaction request, the wireless device information request, or the wireless device transaction request.

18. The non-transitory computer readable medium of claim 11, wherein the wireless service information request, the wireless service transaction request, the wireless device information request, or the wireless device transaction request comprise the following:

a request for a transaction that ports a phone number of the wireless device from one wireless service provider to another wireless service provider;

a request for a transaction that activates a new phone number for the wireless device;

a request for a transaction to transfer from one wireless service provider to another wireless service provider;

a request for a transaction that reactivates wireless service for a wireless device;

a request for a transaction to purchase a wireless service plan;

a request for information and instructions on how to install a SIM card into the wireless device;

a request for instructions on how to transfer a mobile number to another wireless device;

a request for information that provides instructions on how to access a loyalty rewards program; or a request for a transaction for an automatic payment wireless service plan, wherein the wireless device comprises at least one of the following: a wireless phone and a smart speaker.

19. The non-transitory computer readable medium of claim 11, wherein the response is based at least on the keyword and the keyword being associated to the wireless service information request, the wireless service transaction request, the wireless device information request, or the wireless device transaction request; and wherein the wireless service information request, the wireless service transaction request, the wireless device information request, or the wireless device transaction request comprise at least one of the following:

a request for a transaction that ports a phone number of the wireless device from one wireless service provider to another wireless service provider;

a request for a transaction that activates a new phone number for the wireless device;

a request for a transaction to transfer from one wireless service provider to another wireless service provider;

a request for a transaction that reactivates wireless service for a wireless device;

a request for a transaction to purchase a wireless service plan;

a request for information and instructions on how to install a SIM card into the wireless device;

a request for instructions on how to transfer a mobile number to another wireless device;

a request for information that provides instructions on how to access a loyalty rewards program; and a request for a transaction for an automatic payment wireless service plan.

20. The non-transitory computer readable medium of claim 11, wherein the process is implemented by a Mobile Virtual Network Operator; and wherein the wireless devices connect to one of a plurality of Mobile Network Operator networks; and wherein the wireless device comprises at least one of the following: a wireless phone and a smart speaker.

* * * * *